US012664523B2

(12) United States Patent
Sworski et al.

(10) Patent No.: US 12,664,523 B2
(45) Date of Patent: Jun. 23, 2026

(54) SYSTEM AND METHOD FOR INSPECTING VEHICLE BRAKE PADS

(71) Applicant: Valvoline Licensing and Intellectual Property LLC, Lexington, KY (US)

(72) Inventors: Adam Sworski, Ashland, KY (US); Seth Jessie, Lexington, KY (US); Paolo Forchielli, Independence Township, MI (US); Michael R. Wedding, Nicholasville, KY (US)

(73) Assignee: Valvoline Licensing and Intellectual Property LLC, Lexington, KY (US)

( * ) Notice: Subject to any disclaimer, the term of this patent is extended or adjusted under 35 U.S.C. 154(b) by 7 days.

(21) Appl. No.: 18/962,020

(22) Filed: Nov. 27, 2024

(65) Prior Publication Data

US 2025/0173686 A1 May 29, 2025

Related U.S. Application Data

(60) Provisional application No. 63/602,955, filed on Nov. 27, 2023.

(51) Int. Cl.
 G06Q 10/20 (2023.01)
 G06F 3/04845 (2022.01)
 (Continued)

(52) U.S. Cl.
 CPC ......... G06Q 10/20 (2013.01); G06F 3/04845 (2013.01); G06F 3/0488 (2013.01);
 (Continued)

(58) Field of Classification Search
 CPC .. B06T 17/22; G06F 3/04845; G06F 3/04846; G06F 3/04888; G06Q 10/20;
 (Continued)

(56) References Cited

U.S. PATENT DOCUMENTS 5,327,782 A 7/1994 Sato et al.
6,175,778 B1 1/2001 Xu et al.
 (Continued)

FOREIGN PATENT DOCUMENTS

CN 110136189 A * 8/2019 ........... G06T 7/0004
CN 108460776 B * 3/2022 ............. G06T 7/136

OTHER PUBLICATIONS

International Search Report and Written Opinion issued in International Patent Application No. PCT/US2024/057673, mailing date Feb. 13, 2025.

*Primary Examiner* — Erin M Piateski
*Assistant Examiner* — Ashley Tiffany Schoech
(74) *Attorney, Agent, or Firm* — Benesch Friedlander Coplan & Aronoff LLP

(57) ABSTRACT

A method for inspecting a vehicle brake pad, without removal of a vehicle wheel, includes capturing a digital image a side of a brake pad with the wheel installed on the vehicle, and loading the digital image onto a display screen of an image analysis system. An on-screen thickness of each of the backing plate and brake lining is measured as a pixel count distance between a leading and trailing edge of each of the backing plate and brake lining. The image analysis system calculates a ratio between the measured pixel-count thicknesses of each of the backing plate and the brake lining, compares the ratio to a threshold value, and based on that comparison, generates a message indicative whether the brake lining needs to be replaced. The brake pad is replaced in response to a generated message in the image analysis system indicating the brake pad failed inspection.

20 Claims, 17 Drawing Sheets

(51) Int. Cl.

| | |
|---|---|
| *G06F 3/0488* | (2022.01) |
| *G06T 7/00* | (2017.01) |
| *G06T 7/13* | (2017.01) |
| *G06V 10/44* | (2022.01) |
| *G06V 10/75* | (2022.01) |

(52) U.S. Cl.
CPC .............. *G06T 7/0006* (2013.01); *G06T 7/13* (2017.01); *G06V 10/44* (2022.01); *G06V 10/751* (2022.01); *G06T 2200/24* (2013.01); *G06T 2207/30204* (2013.01); *G06T 2207/30252* (2013.01)

(58) Field of Classification Search
CPC ....... G06T 2200/24; G06T 2207/30204; G06T 2207/30248; G06T 7/0006; G06T 7/13; G06V 10/44
USPC ................... 701/291, 314, 315, 316; 702/34
See application file for complete search history.

(56) References Cited

U.S. PATENT DOCUMENTS

| | | | |
|---|---|---|---|
| 8,294,761 | B2 | 10/2012 | McKinley et al. |
| 11,261,930 | B2 | 3/2022 | Cremona et al. |
| 11,328,403 | B2 | 5/2022 | Levin et al. |
| 2014/0139332 | A1 | 5/2014 | Mouchet |
| 2018/0231364 | A1 | 8/2018 | Mian et al. |
| 2021/0088094 | A1 | 3/2021 | Kane et al. |
| 2022/0373050 | A1 | 11/2022 | Jin et al. |
| 2023/0304555 | A1 | 9/2023 | Nagata et al. |
| 2023/0383806 | A1* | 11/2023 | Krishnamurthy ..... F16D 66/027 |

* cited by examiner

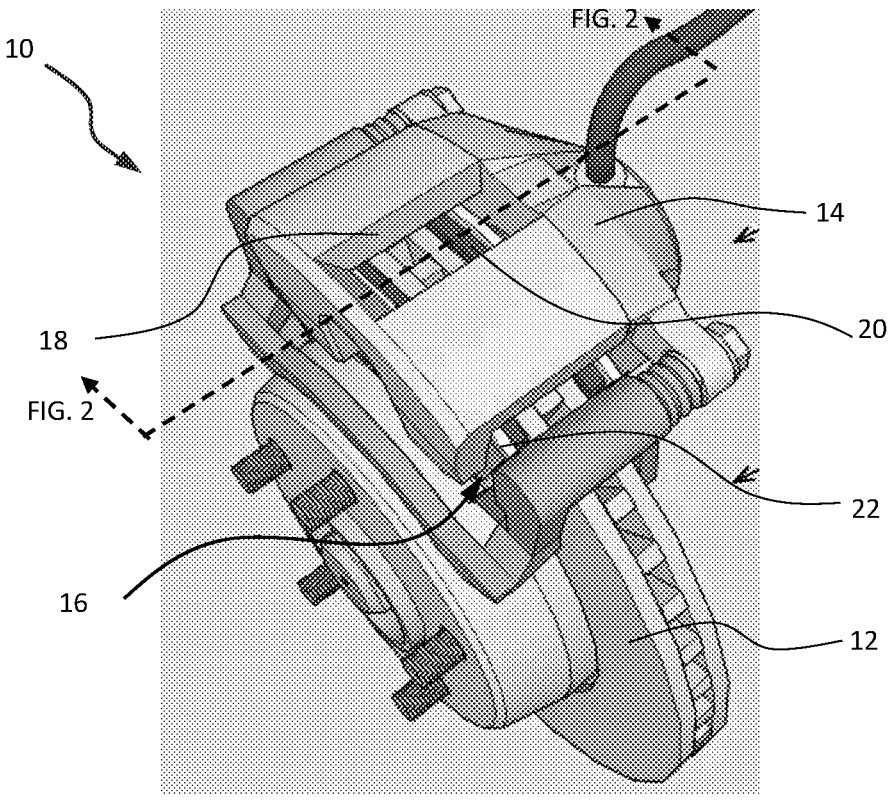
FIG. 1 – Prior Art
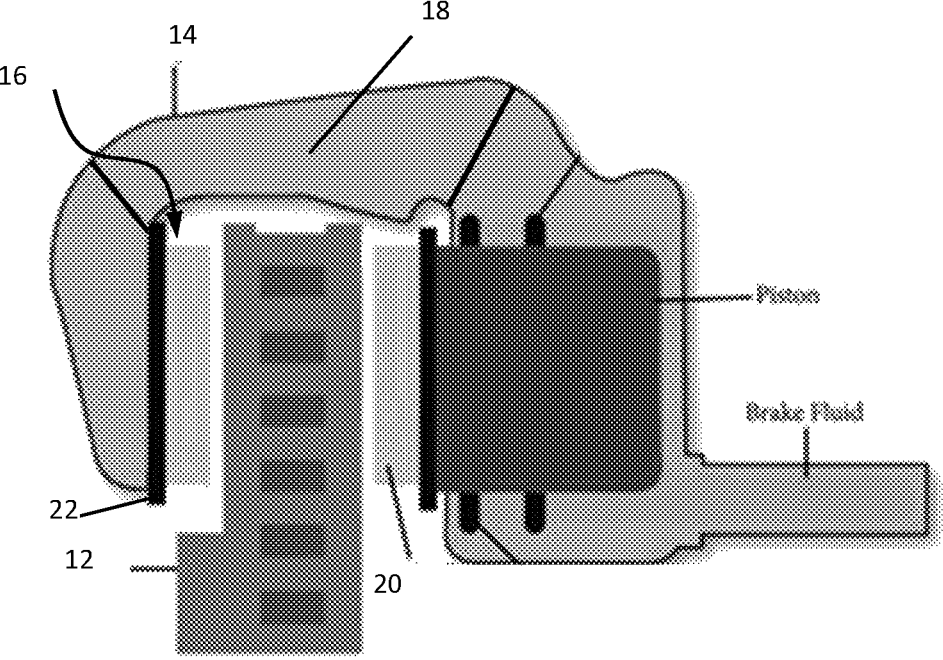
FIG. 2 – Prior Art

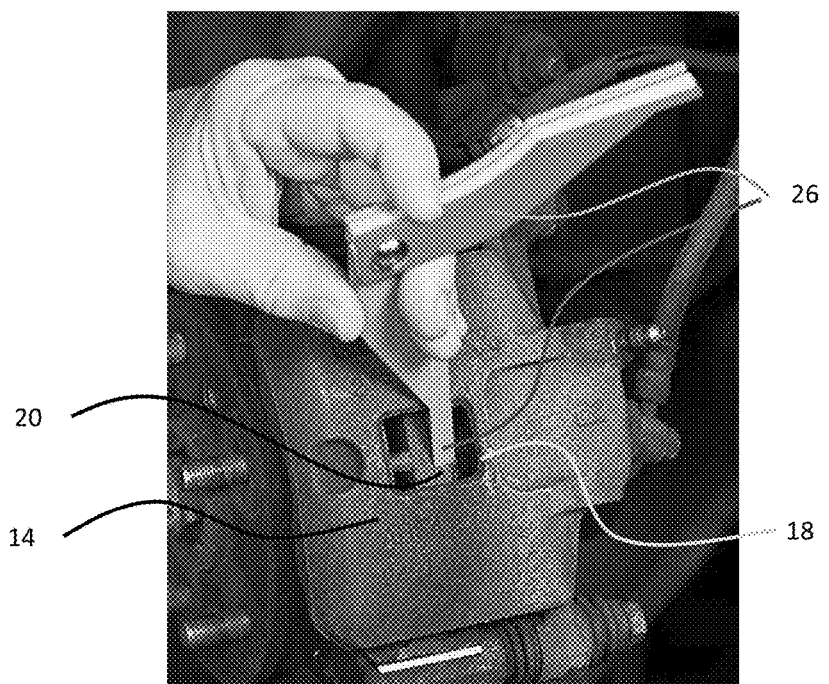
FIG. 3 – Prior Art
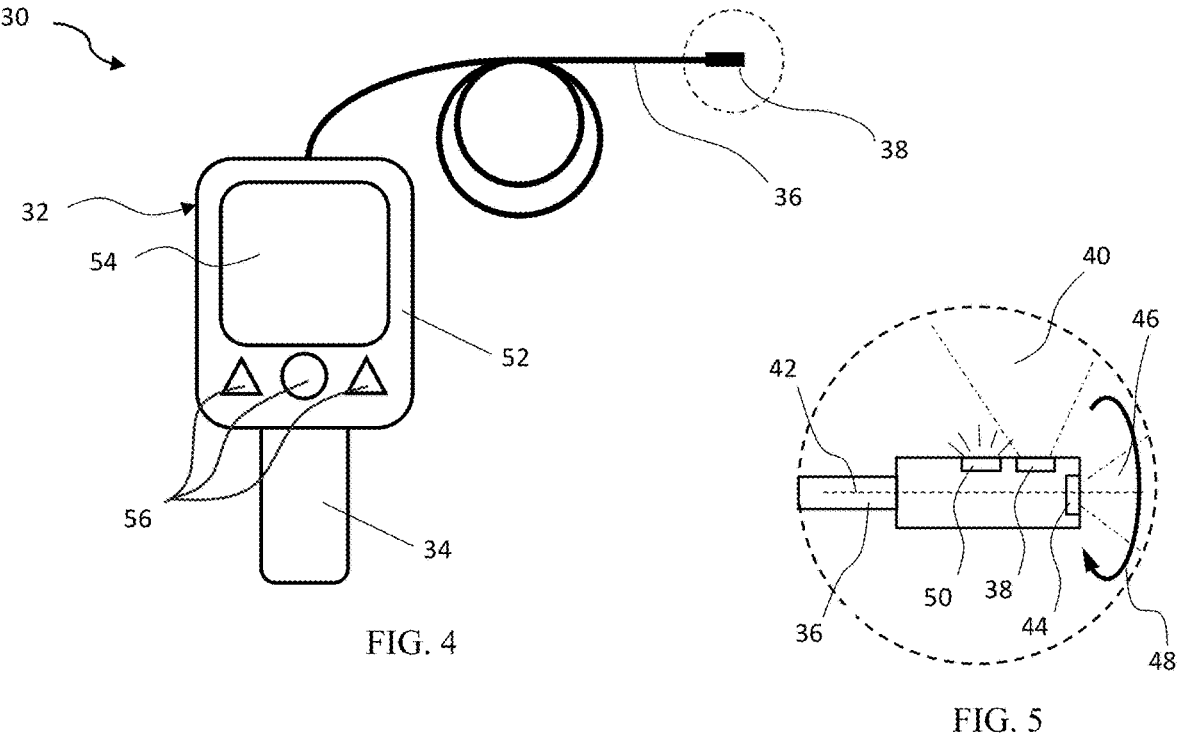
FIG. 4
FIG. 5

172
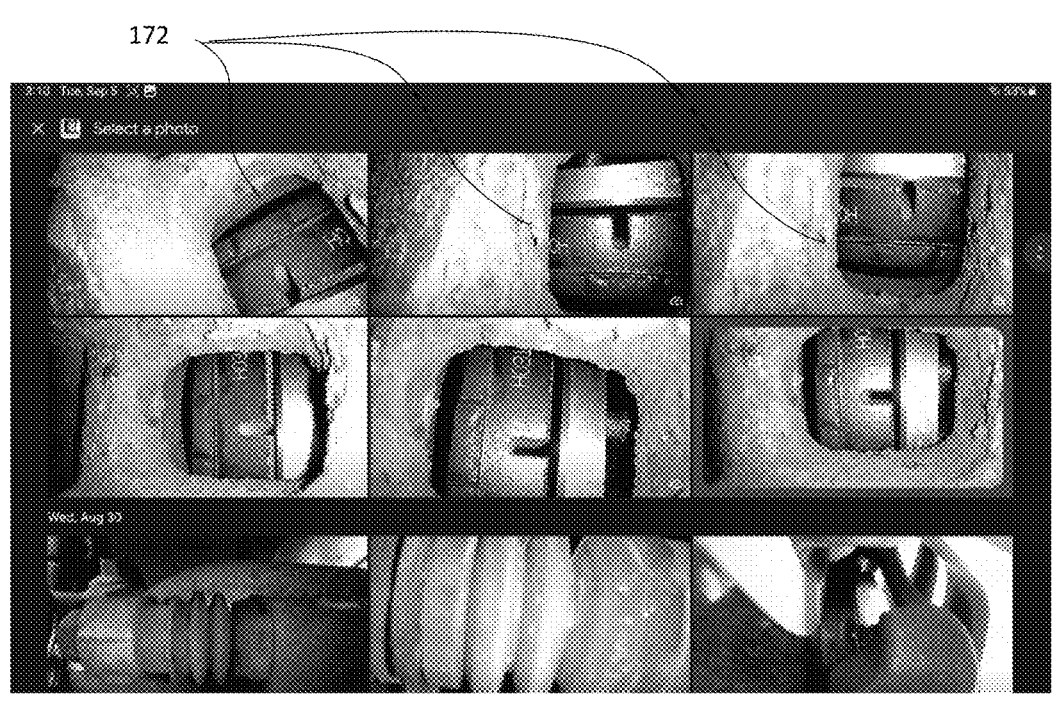
FIG. 17
18    22    20    12
94
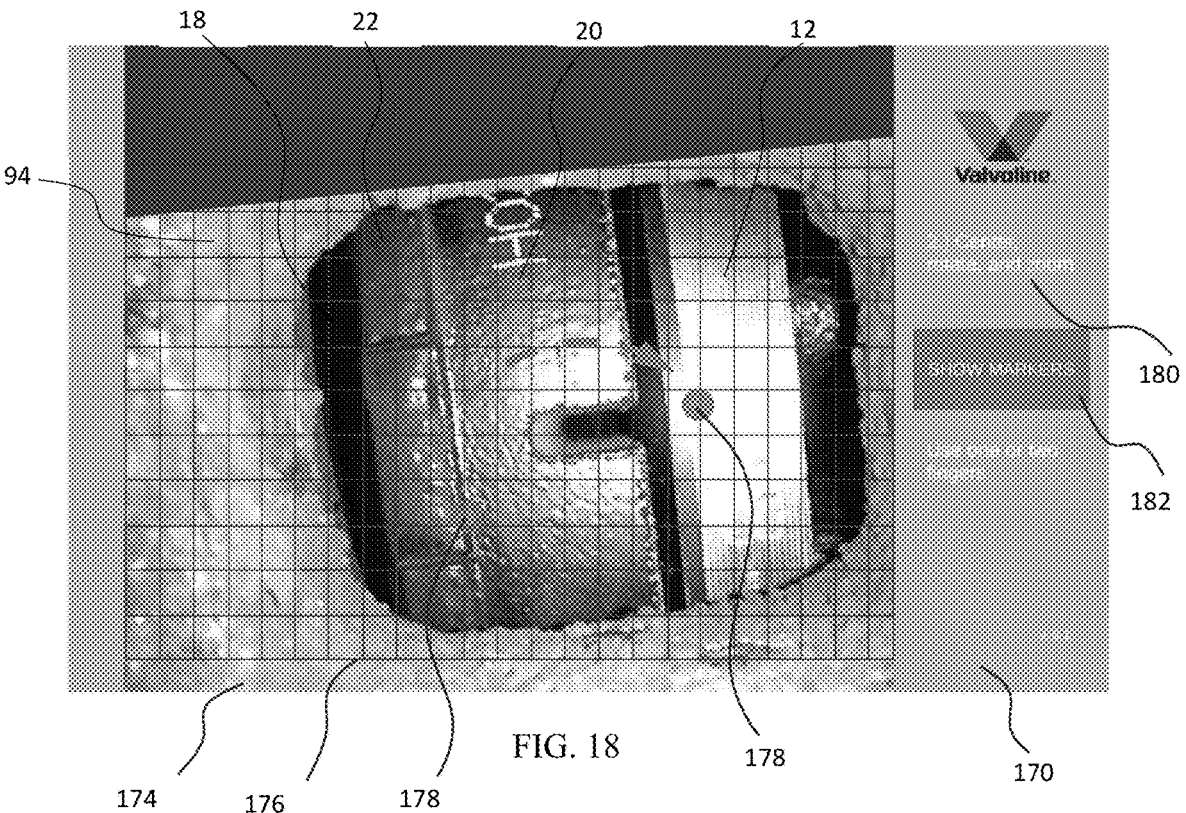
180
182
174    176    178    FIG. 18    178    170

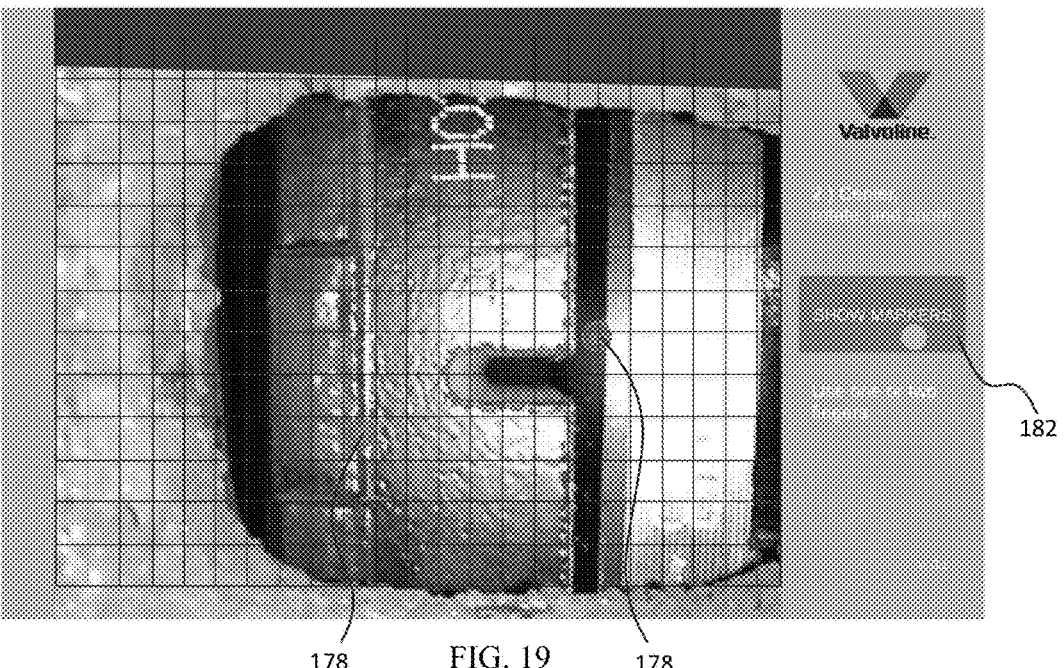
178 FIG. 19 178
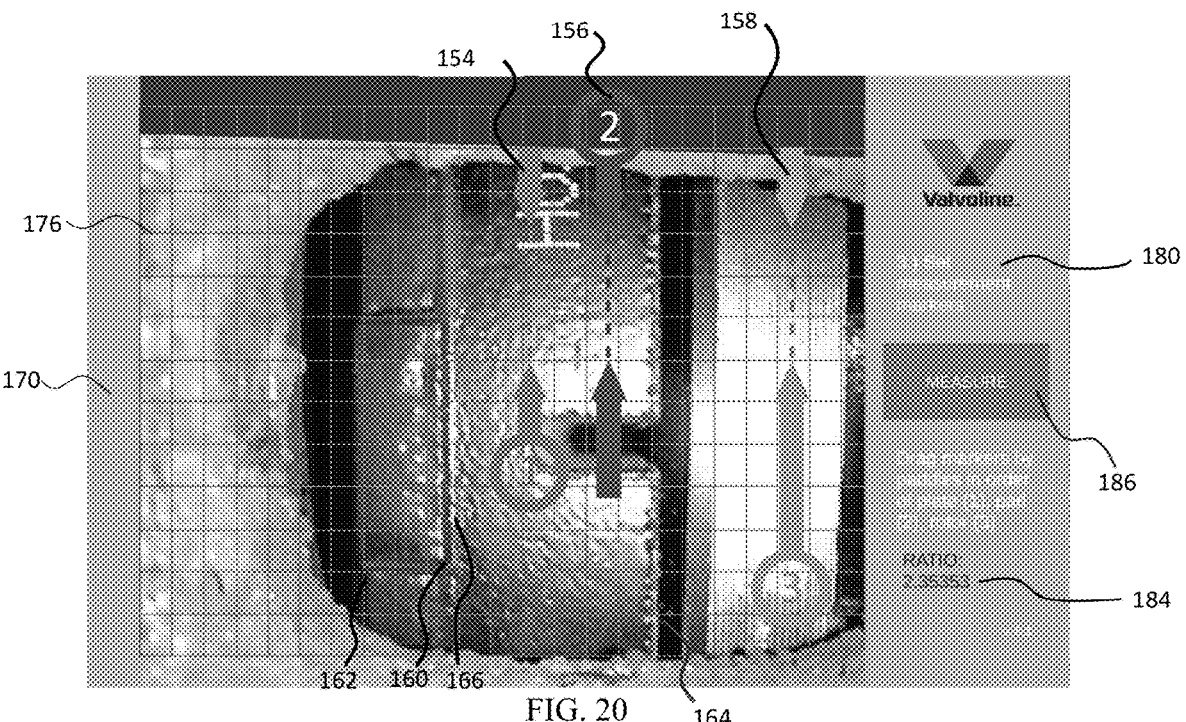
154 156 158
176
170
162 160 166 FIG. 20 164
180
186
184

188

192

196

206

194

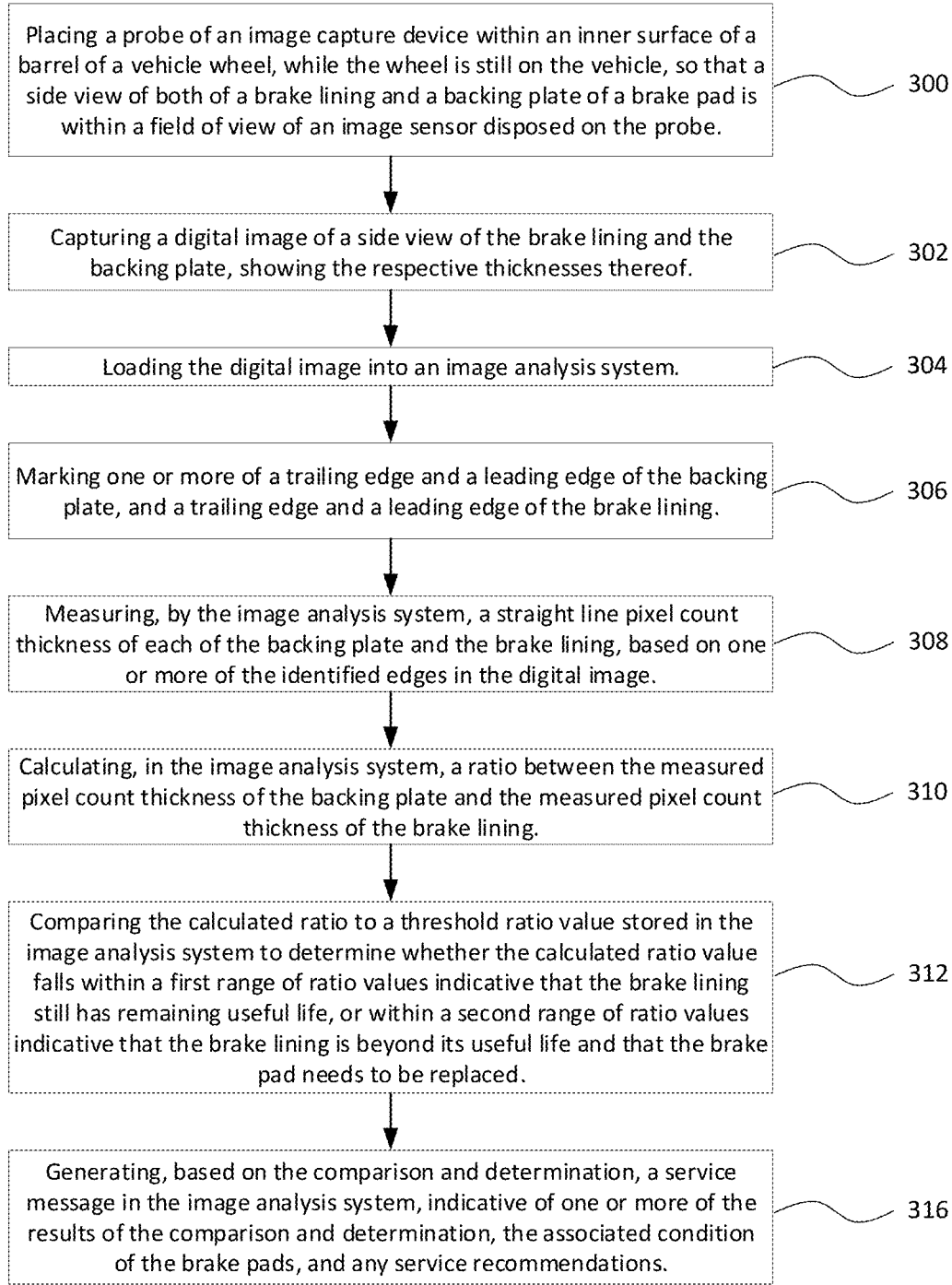

Placing a probe of an image capture device within an inner surface of a barrel of a vehicle wheel, while the wheel is still on the vehicle, so that a side view of both of a brake lining and a backing plate of a brake pad is within a field of view of an image sensor disposed on the probe. — 300

Capturing a digital image of a side view of the brake lining and the backing plate, showing the respective thicknesses thereof. — 302

Loading the digital image into an image analysis system. — 304

Marking one or more of a trailing edge and a leading edge of the backing plate, and a trailing edge and a leading edge of the brake lining. — 306

Measuring, by the image analysis system, a straight line pixel count thickness of each of the backing plate and the brake lining, based on one or more of the identified edges in the digital image. — 308

Calculating, in the image analysis system, a ratio between the measured pixel count thickness of the backing plate and the measured pixel count thickness of the brake lining. — 310

Comparing the calculated ratio to a threshold ratio value stored in the image analysis system to determine whether the calculated ratio value falls within a first range of ratio values indicative that the brake lining still has remaining useful life, or within a second range of ratio values indicative that the brake lining is beyond its useful life and that the brake pad needs to be replaced. — 312

Generating, based on the comparison and determination, a service message in the image analysis system, indicative of one or more of the results of the comparison and determination, the associated condition of the brake pads, and any service recommendations. — 316

FIG. 27

SYSTEM AND METHOD FOR INSPECTING VEHICLE BRAKE PADS

CROSS-REFERENCE TO RELATED APPLICATIONS

This application claims priority to U.S. Provisional Application Ser. No. 63/602,955 filed Nov. 27, 2023, the entire contents of which is hereby incorporated by reference herein.

FIELD

This disclosure relates to systems and methods for inspecting the wear and remaining life of vehicle brake pads.

BACKGROUND

Automobile disc brake systems and their associated brake pads serve to slow or stop a vehicle in motion. In general, brake pads are constructed to have a rigid backing plate to which is mounted a brake lining, which brake lining is made of a block of a consumable or wearable friction material. The vehicle's wheels are each affixed to a steel brake rotor that rotates with the wheels when the vehicle is in motion (i.e., being driven by a driver). When the vehicle's brake pedal is depressed by a driver of the vehicle, hydraulic fluid drives pistons in a brake caliper to force a pair of opposing brake pads to move toward the rotating rotor of the disc brake, which rotor is disposed between the opposing brake pads. In doing so, a braking surface of the brake lining of each brake pad is brought into contact with or against the rotating braking surfaces of the rotor, in a clamp-like manner, to impart sliding friction from the brake lining of the brake pad to the rotating surface of the rotor, so as to gradually slow or stop rotation of the rotor and the vehicle wheel to which the rotor is attached. Accordingly, brake pads and brake rotors are each considered consumable wear parts, in that the sliding friction that occurs between the brake lining and rotor during the vehicle's repeated braking cycles will, over time, slowly wear away each of the friction material of the brake lining, and to a lesser degree a small amount of the thickness of the brake rotor. Brake pads, however, are designed to wear away much more quickly than the brake rotors on which the brake lining acts.

Because the brake lining of brake pads and rotors wear away over time with repeated breaking cycles, such brake pads and rotors must each undergo periodic inspection to ensure that there is a sufficient thickness of the brake lining remaining on the brake pad, above a specified threshold limit, so that a driven vehicle may be brought to a stop safely when the brakes are engaged by the driver. If the brake lining thickness is below the threshold limit when the vehicle is being operated, the driver runs the risk of the brake lining, and therefore the brakes, failing and not being able to stop the vehicle safely (e.g., not stopping at all, or in time, or within a desired distance) when the driver attempts to apply the brakes. Additionally, if the brake lining wears away or breaks away completely, then the backing plate is the only part of the brake pad remaining. In such a situation, when further braking of the vehicle occurs, the metal backing plate will come into contact with the metal rotor (i.e. metal on metal contact), which will cause significant damage to both surfaces thereby increasing the cost of maintenance and repair.

Unfortunately though, the current process for inspecting the brake linings of brake pads is labor intensive, and requires a service technician first placing a vehicle on a vehicle lift or jacking up the vehicle one wheel at a time, removing the lug nuts holding the wheels on the vehicle, and removing the wheels from the vehicle such that the brake pads and rotors are visible through inspection holes or openings formed in each of the brake calipers of each vehicle wheel. Once the wheels have been removed, the technician can view a side profile, and thus the thickness, of the brake lining on the brake pads through the inspection hole in each respective caliper. The technician then typically holds a successive series of brake lining thickness gauges, having known and marked thickness dimensions, against the side of the brake pad's friction material to ascertain whether the remaining friction material on the brake pad is thicker or thinner than each such thickness gauge, and determine a thickness dimension range within which the remaining thickness of the friction material of the brake pad lies. From this determined range, the technician can then determine whether the remaining thickness of the friction material falls below a threshold limit for safe braking operation of the vehicle.

Accordingly, there is a need for an improved system and method, which is faster, less labor intensive, and does not require removal of the wheels of the vehicle, for one or more of inspecting vehicle brakes, determining the remaining thickness of the brake lining of brake pads, determining whether the remaining thickness of the brake lining is above a threshold thickness, and/or determining the remaining thickness of the disc brake rotors.

The description provided in the background section should not be assumed to be prior art merely because it is mentioned in or associated with the background section. The background section may include information that describes one or more aspects of the subject technology.

SUMMARY

A system of one or more computers and/or handheld computing devices can be configured to perform particular operations or actions by virtue of having software, firmware, hardware, or a combination of them installed on the system that in operation causes or cause the system to perform the actions. One or more computer programs or applications can be configured to perform particular operations or actions by virtue of including instructions that, when executed by data processing apparatus, cause the apparatus to perform the actions. One general aspect includes a method for inspecting a vehicle brake pad. The method also includes capturing a digital image, via an image capture device, of a side view of a brake pad installed on a vehicle, without removing the wheel that is braked by the brake pad, the side view showing a respective thickness of each of a brake lining and a backing plate of a brake pad; loading the digital image from the image capture device onto a display screen of a computerized image analysis system; measuring, by the image analysis system, a respective on-screen thickness of each of the backing plate and brake lining shown in the digital image on the display screen, where each of the respective thicknesses are measured as a pixel count distance of a number of adjacent pixels along a straight line on the display screen between a leading edge and a trailing edge of each of the backing plate and the brake lining respectively; calculating, by the image analysis system, a ratio between the measured pixel-count thickness of the backing plate and the measured pixel-count thickness of the brake lining shown in the digital image, as the primary inspection criteria; comparing, in the image analysis system, the calculated ratio to a threshold ratio value to determine whether the calculated ratio value falls within a first range of ratio values indicative that the brake lining has failed inspection and is beyond its useful life requiring the brake pad to be replaced; generating, by the image analysis system, a service message displayed on the display screen of the image analysis system indicative of one or more results of the comparison and determination, the associated condition of the brake pad, and/or any service recommendations related thereto; and replacing the brake pad of the vehicle in response to a displayed service message generated on the display screen indicative that the brake pad has failed inspection and/or should be replaced. Other embodiments of this aspect include corresponding computer systems, apparatus, and computer programs recorded on one or more computer storage devices, each configured to per- form the actions of the methods.

Implementations may include one or more of the following features. The method where the digital image of the side view is taken in a direction substantially perpendicular to a rotational axis of a brake rotor on which the brake pad acts, to show a respective thickness of each of the brake lining and backing plate in the digital image. The method may further include, prior to capturing the digital image, placing an imaging sensor of the image capture device within the barrel of a vehicle wheel that is still mounted to the vehicle, at a location adjacent the brake pad such that a thickness of the brake lining and the backing plate of the brake pad is visible within a field of view of the imaging sensor. The imaging sensor is disposed at a distal end of a probe of the image capture device. The imaging sensor captures the digital image of the side view of the brake pad through an inspection hole defined in a brake caliper to which the brake pad is affixed, and through which the thickness of each of the brake lining and backing plate are visible. The method may also include displaying on the display screen of the image analysis system a live view of that which is visible in the field of view of the imaging sensor, and adjusting a position of the imaging sensor with respect to the brake so as to align predetermined features of one or more of the brake lining or backing plate with one or more onscreen alignment guides displayed in a fixed orientation in the display screen. The method may further include sending the digital image from the image capture device to the digital analysis system via one of a communications network or hardwired link.

The method may also include, after loading the digital image onto the display screen of the image analysis system, orienting the digital image in the display screen of the display device by one or more of panning, rotating, or zooming the digital image on the display screen, such that the leading and trailing edges of the backing plate and brake lining are arranged vertically on the display screen. The orienting may be performed automatically by the image analysis system utilizing automatic edge detection to iden- tify each of the leading and trailing edges of each of the backing plate and brake lining, and automatically align such edges in a vertical orientation on the display screen. The method may further include applying, by the image analysis system, an alignment grid overlay of vertical and horizontal lines on top of the digital image of the side view of the brake pad on the display screen, to assist in vertically orienting the leading and trailing edges of the backing plate and brake lining on the display screen. The measuring of the on-screen thickness of each of the backing plate and brake lining shown in the digital image is performed by determining, by the image analysis system, the straight line pixel count distances in the horizontal direction between the respective markers located at each of the leading and trailing edges of each of the backing plate and brake lining. The plurality of digital markers each may include a vertical line shown on the display screen that is to be aligned with one of the plurality of edges of the backing plate or brake lining.

The marking step may include manually moving the plurality of digital markers in a horizontal direction on the display screen, such that the vertical line of each marker is aligned with each of the vertically oriented leading and trailing edges of the backing plate and brake lining shown in the digital image on the display screen. The leading edge of the backing plate is positioned at the same location on the display screen as the trailing edge of the brake lining due to a leading face of the backing plate being bonded to a trailing face of the brake lining. Manually moving the plurality of digital markers may include moving a first vertical line of a first digital marker to a first location on the display screen in alignment with the vertically oriented trailing edge of the backing plate, moving a second vertical line of a second digital marker to a second location on the display screen in alignment with the vertically oriented leading edge of the backing plate that also corresponds with the trailing edge of the brake lining, and moving a third vertical line of a third digital marker to a third location on the display screen in alignment with the vertically oriented leading edge of the brake lining. The measuring of the on-screen thickness of the backing plate is performed by measuring the number of adjacent pixels in a straight horizontal line between the first digital marker and the second digital marker, and where the measuring of the on-screen thickness of the brake lining is performed by measuring the number of adjacent pixels in a straight horizontal line between second digital marker and the third digital marker.

The method may include displaying, on the display screen in real time, a live-changing calculated ratio between the thickness of each of the backing plate and brake lining, as each marker is moved onscreen. The marking may option- ally include, automatically placing, by the image analysis system, separate ones of the plurality of digital markers at the locations on the display screen at which each of the vertically oriented leading and trailing edges of the backing plate are located, with the vertical line of each such digital marker aligned with a respective vertical edge of each of the leading and trailing edges of each of the backing plate and brake lining.

The generated service message displayed onscreen in response to comparison of the calculated ratio to the thresh- old value for determining when to change the brake pads, may include at least one of a message indicative that the inspected brake pad has passed inspection and there is a sufficient thickness of brake lining left to continue safely operate the vehicle, or the inspected brake pad has failed inspection and there is not a sufficient thickness of brake lining remaining, relative to the backing plate thickness, to continue safely operate the vehicle and the brake pads should be replaced. The method may include repeating each of the steps for each brake pad installed on the vehicle. The method may include storing the results of the inspection for each inspected brake pad in a customer database in com- munication with the image analysis system. Implementa- tions of the described techniques may include hardware, a method or process, or computer software stored on one or more of a memory or a computer-readable non-transitory storage medium.

BRIEF DESCRIPTION OF DRAWINGS

The present invention is described in detail below with reference to the attached drawing figures, wherein:

FIG. 1 is a schematic perspective view of a prior art disc brake system, including a brake rotor, brake caliper, and brake pads having a backing plate and brake lining;

FIG. 2 is a schematic side cross sectional view of a prior art floating brake caliper, showing brake linings, backing plates, a rotor, and an inspection hole formed in the caliper.

FIG. 3 is a schematic perspective view of a prior art floating disc brake caliper, depicting a prior art method of inspecting the brake lining thickness;

FIG. 4 is a schematic diagram of a first embodiment of an inspection system of the present disclosure, including an image capture device with a fully integrated image analysis system therein;

FIG. 5 is a schematic diagram detail view of a distal end of a probe of an image capture device of the present disclosure, at which at least one imaging sensor is disposed;

FIG. 17 is a screenshot of an embodiment of one screen of an analysis GUI of the image analysis system disclosed herein, depicting a captured image selection screen from which a captured digital image may be recalled and loaded into the analysis GUI to be used for brake inspection and analysis;

FIG. 18 is a screenshot of an embodiment of a captured image of a brake lining and backing plate taken through the inspection hole of a brake caliper, which captured image has been loaded into a viewing window of an embodiment of the analysis GUI of the image analysis system;

FIG. 19 is a screenshot of an embodiment of the analysis GUI displaying the captured image, as shown in FIG. 18, after the captured image has been manipulated in the viewing window by one or more of a rotating, moving, and/or zooming of the image in the viewing window to align the edges of the backing plate and brake lining in a vertical orientation, but before the on-screen selectable button labeled "SHOW MARKERS" has been selected;

FIG. 20 is a screenshot of an embodiment of the analysis GUI displaying the captured image, as shown in FIG. 19, over the top of which has been overlaid a plurality of movable identification markers;

FIG. 27 is a flow chart depicting an exemplary embodiment of a method according to the present disclosure;

DETAILED DESCRIPTION

Figure 6:
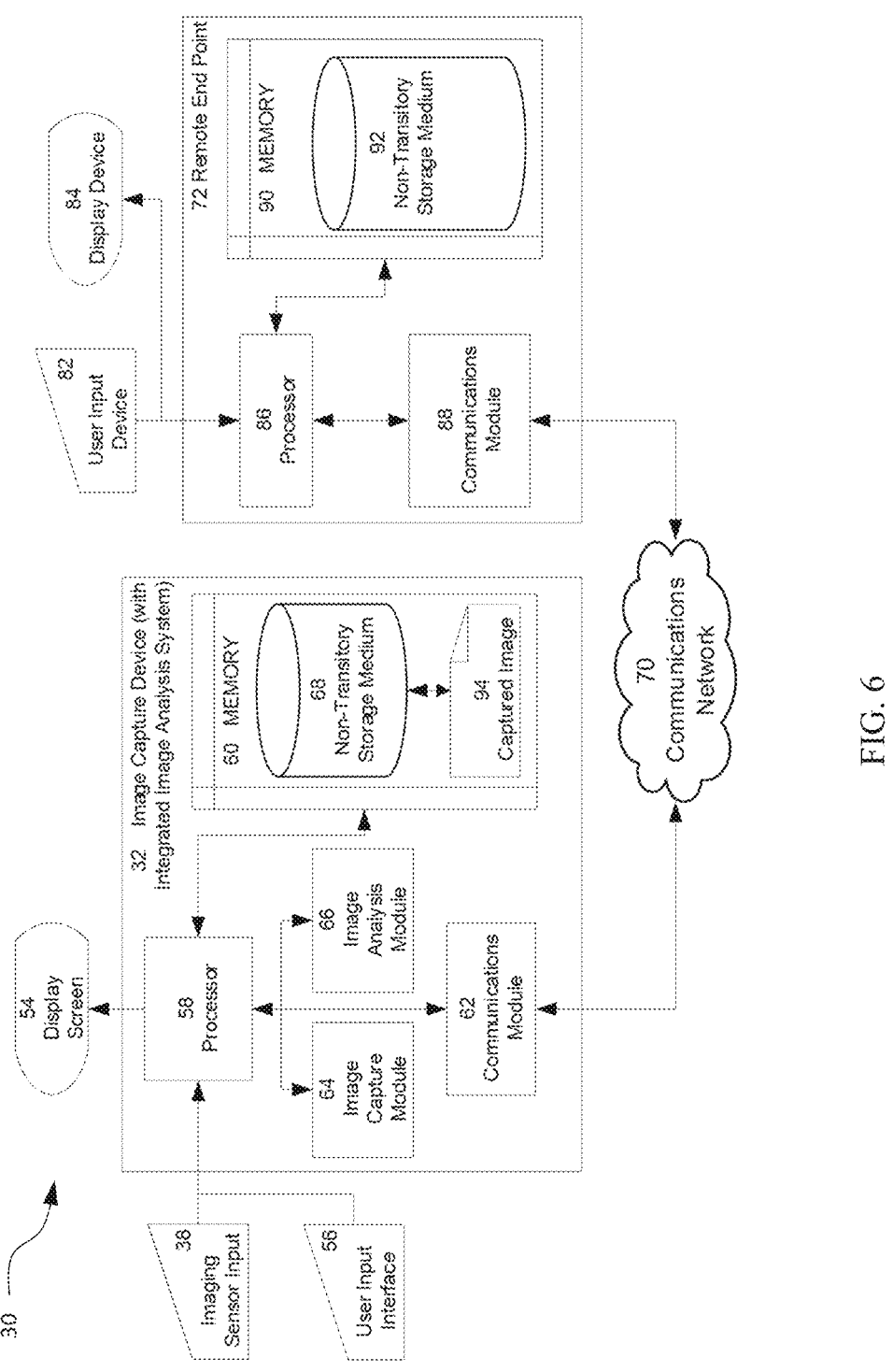
FIG. 6 is a schematic block diagram of a first embodiment of an inspection system of the present disclosure, having an image capture device with a fully integrated image analysis system therein, and various components thereof.

Various embodiments now will be described more fully hereinafter with reference to the accompanying drawings, which form a part hereof, and which show, by way of illustration, specific embodiments. However, this invention may be embodied in many different forms and should not be construed as limited to the embodiments set forth herein. Rather, these embodiments are provided so that this disclosure will be thorough and complete, and will fully convey the scope of the invention to those skilled in the art. The following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments may be readily combined without departing from the scope or spirit of the present disclosure.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Referring to FIG. 1, an embodiment of a typical prior art disc brake system 10 is shown, including both a brake rotor 12 to which a wheel (not shown) of the vehicle would be attached, and a brake caliper 14 that houses the brake pads 16 that are driven by hydraulic brake fluid to act on the brake rotor 12 to slow or stop the vehicle when a driver depresses the brake pedal. Also shown is a typical inspection hole 18 or window formed in the brake caliper 14 through which the brake lining 20 and backing plate 22 of the brake pad 16 are visible for inspection of the remaining thickness of the brake lining 20 after removal of the vehicle wheel.

Referring to FIG. 2, a schematic cross sectional diagram of a typical floating brake caliper 14 is shown, to illustrate the location of the backing plate 22 and brake lining 20 of the brake pads 16 in relation to the brake rotor 12 that is acted on by the brake pads 16

FIG. 3 depicts a prior art floating disc brake caliper, depicting a prior art method of inspecting the brake lining thickness, in which the vehicle wheel has been removed to gain physical access to the inspection hole in the brake caliper. In such prior art method, a technician places a prior art set of brake lining thickness gauges 26 through the inspection hole 18 in the caliper 14 and against the side face of the brake lining 20 in the thickness direction to compare the remaining thickness of the brake lining 20 to the known and marked thicknesses that are printed on each of the various lining thickness gauges 26. In doing so, the technician can determine a true thickness dimension measurement range within which the remaining thickness of the brake lining 20 lies, in order to determine whether the brake linings 20 have a sufficient thickness remaining to be operated safely, or whether they are unsafe and the brake pads 16 need to be replaced.

The inspection system 30 disclosed herein provides devices, systems, and methods for inspecting a vehicle brake pad 16 and the remaining brake lining 20 thickness, without needing to first remove the wheels of the vehicle or to gain physical access to the brake pads 16, by analyzing a digital image take of the side of the brake lining 20 through the inspection hole 18 in the brake caliper 14.

Referring to FIGS. 4 and 5, in one embodiment of the inspection system 30 of the present disclosure, an image capture device 32, for use in capturing a digital image of the brake lining 20 without removing the wheel of the vehicle, is shown. The image capture device 32 may be a handheld device that includes a handle 34, attached to which is a probe 36 extending therefrom. In some embodiments, the probe 36 can be one of a rigid shaft or tube, a flexible shaft or tube, an articulated tube, or a telescoping shaft or tube. In still another embodiment, the probe 36 can be a gooseneck tube that is flexible but will hold its shape after being bent to a desired position or shape. In FIG. 4, the probe is shown as a gooseneck probe that is coiled in two loops. At a distal end of the probe 36 is disposed an imaging sensor 38, such as for example a digital camera, laser imaging device, or the like, having a first field-of-view 40 that is directed generally perpendicular to a longitudinal axis 42 of the distal end of the probe. In another embodiment, the probe 36 may include the imaging sensor 38 as a first imaging sensor, and further include a second imaging sensor 44 disposed at the distal end of the probe 36 having a second field of view 46 directed generally parallel to the longitudinal axis 42 of the probe 36 that can view objects positioned past the end of the probe. In one embodiment (not shown), the distal end of the probe 36 could include a wing extending laterally (or longitudinally) therefrom to provide a kickstand-like feature that can be placed against an object and used to support the distal end of the probe 36 for placement against a surface of a vehicle wheel, for example an inner surface of a barrel of a vehicle wheel, to assist with placement of the imaging sensor 38 and its orientation.

Referring to FIG. 5, in one embodiment, the imaging sensor 38 disposed at the end of the probe 36 is a camera having a lens with a center of its field of view 40 pointing in a direction that is oriented 90-degrees, or perpendicular, to the longitudinal axis 42 of the distal end of the probe 36. In such an embodiment, the camera can capture images of objects within its field-of-view 40, that are located in a line of sight of the camera and at an angle of 90-degrees to the longitudinal axis 42 of the distal end of the probe. The camera may also be rotatable 48 about the longitudinal axis 42 of the distal end of the probe 36 (i.e. twistable on the probe) at the location of the probe 36 in/on which the camera is mounted. The ability to rotate the camera (or other type of imaging sensor 38) about the longitudinal axis 42 of the probe 36 permits quick alignment of the camera toward the location of the brake pad 16. Furthermore, the second imaging sensor 44 may also be a second camera lens disposed at the very distal end of the probe 36 facing a direction parallel to the longitudinal axis 42 of the distal end of the probe 36.

In alternate embodiments, the imaging sensor 38 is not disposed in a fixed orientation of 90-degrees to the longitudinal axis 42 of the distal end of the probe 36. Rather, the imaging sensor 38 has a lens that may be selectively fixed at alternate discreet angles less than 90-degrees to the longitudinal axis of the distal end of the probe 36. In still further embodiments, the imaging sensor 38 may be selectively rotatable or articulable with respect to a plane perpendicular to the longitudinal axis of the probe 36, so as to capture images taken at angles that are variable with respect to the longitudinal axis of the distal end of the probe 36. In still another embodiment, the imaging sensor 38 is pointed in a direction aligned with the longitudinal axis of the probe 36, and the distal end of the probe 36 at which the imaging sensor 38 is disposed may be manually articulated by a proximally located mechanical control, such as an articulation cable (not shown), so as to angle the distal end of the probe 36, and by association the orientation of the imaging sensor 38 thereon, to any desired angle.

Referring further to FIG. 5, the distal end of the probe 36 in/on which the imaging sensor 38 is disposed may also have a light source 50 either integrated therein or disposed thereon to project lighting so as to illuminate the objects within the field of view 40 of the imaging sensor 38. Accordingly, the light source ensures the imaging sensor 38 can capture well-lit digital pictures, scans, or video of such objects, such as for example the inspection hole 18 and side faces of the brake lining 20 and backing plate 22 of the disc brake system. The light source 50 may be an LED, fiber optic lighting, or other such similar lighting source that can cast a desired structured lighting or illumination pattern onto the brake lining through the inspection hole in the brake caliper. In some embodiments, a brightness of the light cast by the light source 50 is adjustable, and the light source 50 is designed to ensure sufficient light availability for images taken at short distances or with short image capture times or camera exposures. In further embodiments, the light source 50 may be configured to permit the projection of colored light in addition to standard white or natural light. The ability to change the color of the light source from white light to alternate colors may aid in the identification of the various components of the brake system.

In one embodiment of FIG. 4, the handle 34 of the image capture device 32 may be integrated into, or with, a housing 52 that further houses an integrated display screen 54 on which the digital images captured by the imaging sensor 38 may be displayed and viewed. This display screen 54 may be a touch screen. In such an embodiment, the housing 52 may further include one or more user input interface 56, such as a plurality of physical buttons or other controls disposed in the housing 52, or a graphical user interface (GUI), or touchscreen as part of the display screen 54 that includes one or more digital buttons (not shown) on the display screen 54 that can be manipulated via touch controls. The display screen 54 is configured to permit at least the live previewing of objects positioned within the field of view 40 of the imaging sensor 38, viewing digital images captured with the imaging sensor 38, and/or manipulating the captured images. In some embodiments, the user input interface 56 is configured to control various functions of the image capture device 32, including initiating image capture with the imaging sensor 38 to capture digital images.

Figure 7:
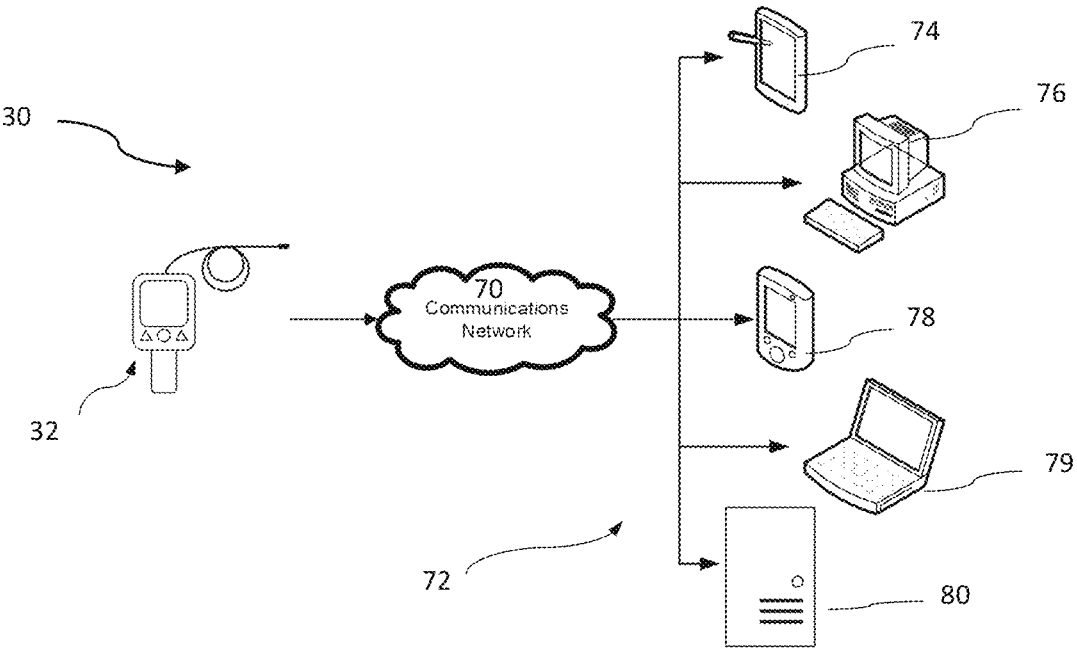
FIG. 7 is a high level schematic block diagram of a system architecture of the first embodiment of the inspection system of FIG. 6.

Referring further to the embodiment of FIG. 4, and with reference to FIGS. 6 and 7, disposed within the image capture device 32, in one embodiment of the inspection system shown in FIG. 4, is a computer processor 58, a memory 60, a communications module 62, an image capture module 64, an image analysis module 66, and a non-transitory computer-readable storage medium 68 containing computer-executable programming instructions, which when executed by the processor cause the performance of one or more operations of a method of capturing a digital image using the imaging sensor 38, and/or inspecting and analyzing a brake pad 16 or brake lining 20 of a brake pad shown in the captured digital image based on details from the captured digital image. The non-transitory computer-readable storage medium 68 is further configured to store therein the captured images (i.e. digital images) taken by the imaging sensor 38. The image capture module 64 is configured to capture digital images within the field of view 40 of the imaging sensor 38 and store them in one or more of the memory 60 or the computer readable storage medium 68. The image analysis module 66 is configured to analyze the captured digital images (as will be explained in greater detail below) to determine whether there is sufficient remaining thickness of a brake lining 20 of a brake pad 16 for it to pass inspection and be considered safe for continued use, or if it is instead too thin, fails inspection, and therefore needs to be replaced. The communications module 62 in this embodiment is configured to transmit one or more of the captured digital images and the results of the related inspection analysis thereof, via a communications network 70, to one or more remote end points 72, such as for example a tablet computer 74, a desktop computer 76, a handheld smart device 78 such as a cellular or mobile phone, a laptop computer 79, or a remote storage server 80 configured to store customer records of prior maintenance visits. Such remote end points may have one or more of their own user input device 82, display device 84, processor 86, communications module 88, memory 90, or non-transitory storage medium 92. The communications network 70 can include, for example, any one or more of a personal area network (PAN), a local area network (LAN), a campus area network (CAN), a metropolitan area network (MAN), a wide area network (WAN), a broadband network (BBN), the Internet, and the like. Further, the network can include, but is not limited to, any one or more of the following network topologies, including a bus network, a star network, a ring network, a mesh network, a star-bus network, tree or hierarchical network, and the like. The network 70 can further include both wired ethernet connections and wireless network connections, such as Wi-fi, Bluetooth, cellular, or other such known wireless network connections.

Figure 8:
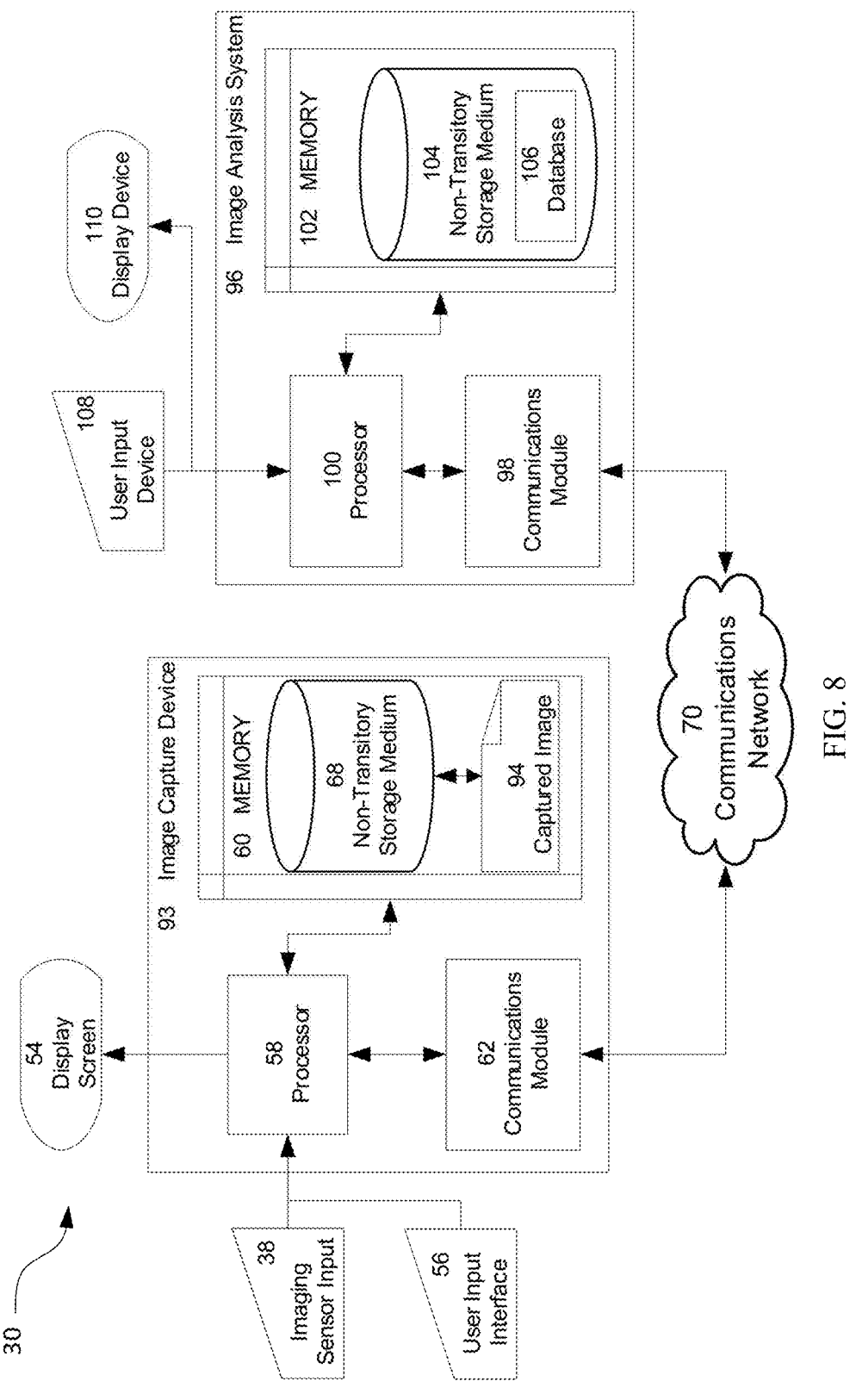
FIG. 8 is a schematic block diagram of an alternate second embodiment of an inspection system of the present disclosure, having an image capture device connected to a remote image analysis system by a communications network, and respective components thereof.

Referring to FIG. 8, in an alternate embodiment of the inspection system 30 of the present disclosure, unlike in the embodiment disclosed above and as shown in FIG. 6, the image capture device 32 does not contain any integrated image analysis module or analysis capabilities, and is primarily used to capture digital images and send them to a remote image analysis system 96, but is itself incapable of performing the image inspection analysis of the brake linings. Accordingly, in such embodiment, disposed within the image capture device 32 is a computer processor 58, a memory 60, a communications module 62, an image capture module 64, and a non-transitory computer-readable storage medium 68 containing computer-executable programming instructions, which when executed by the processor 58 causes the performance of one or more operations of a method of capturing a digital image 94 using the imaging sensor 38. In such alternate embodiment, the communications module 62 is configured to retrieve the captured and stored digital images 94 from the storage medium 68 of the image capture device 32 and send them to a separate remote image analysis system 96 for post processing and inspection analysis of the brake lining 20 shown in the captured images 94 based on the details in the images 94.

The communications module 62 in the image capture device is thus configured to send the images 94 from one or more of the memory 60 or non-transitory storage medium 68 of the image capture device 32 to the remote image analysis system 96 via the communications network 70. In such embodiment, the image analysis system 96 has its own communications module 98 connected to the communications network 70 for receiving the digital images sent to it from the image capture device 32, and its own processor 100, memory 102, non-transitory computer-readable storage medium 104 and/or database 106, user input device 108, and display device 110. In this embodiment, the remote image analysis system 96 performs the analysis of the captured digital images to determine whether the remaining thickness of a break lining 20 of a brake pad 16 passes inspection and is safe for continued use, or if it fails inspection and needs to be replaced. The results are stored either locally in the image analysis system 96 (for example in a database 106 and/or in the non-transitory computer readable storage medium 104) or may further be communicated via the communications network 70 to an alternate remote storage server (not shown) that is configured to store customer records of prior maintenance visits.

Referring to FIGS. 9-12, yet another alternate embodiment of an inspection system 30 is shown. In such embodiment, an alternate embodiment of an image capture device 112 (see FIGS. 9-11) is shown and includes a handle 34 and a probe 36 having an imaging sensor 38 disposed at a distal end thereof, similar to that of the earlier described embodiments. However, in this alternate embodiment shown in FIGS. 9-11, the image capture device 112 further includes a support base 114 secured at opposing first and second ends thereof, to each of a respective top end and a bottom end of the handle 34, and having a middle portion 116 configured to rest on a flat surface, such as a table, a desk, the ground, or the like. The middle portion 116 of the support base includes an integrated mock assembly 118 of a brake pad and rotor, that is configured to be used to train technicians how to use the inspection system 30, by using the mock assembly 118 as a testing/training example. The mock assembly 118 includes each of a mock section of a brake rotor 120 integrally coupled to the middle portion of the support base 116, a mock brake lining 122 integrally coupled adjacent the mock section of rotor 120, and a mock backing plate 124 integrally coupled adjacent the mock brake lining 122 on the side opposite the mock rotor 120. Affixed to an outside surface of the mock backing plate 124 is one or more magnets 126, such that the image capture device 112 can be easily stored by magnetically coupling the magnets 126 on the support base 114 of the image capture device 112 to any ferrous or magnetic surface, such as for example a ferrous metallic shelf or table, or a vertical support post thereof, or a steel hydraulic jack of a commercial vehicle lift used in brake inspection. The support base 114 further includes an integrally connected protective storage cap 128 or clip that is configured to secure therein the distal end of the probe 36 in which the imaging sensor 38 is disposed, when the image capture device 112 is not in use. In this manner, the storage cap 128 serves to protect the imaging sensor 38 from damage and mitigates the risk of scratching or chipping a lens of the imaging sensor 38.

Figure 9:
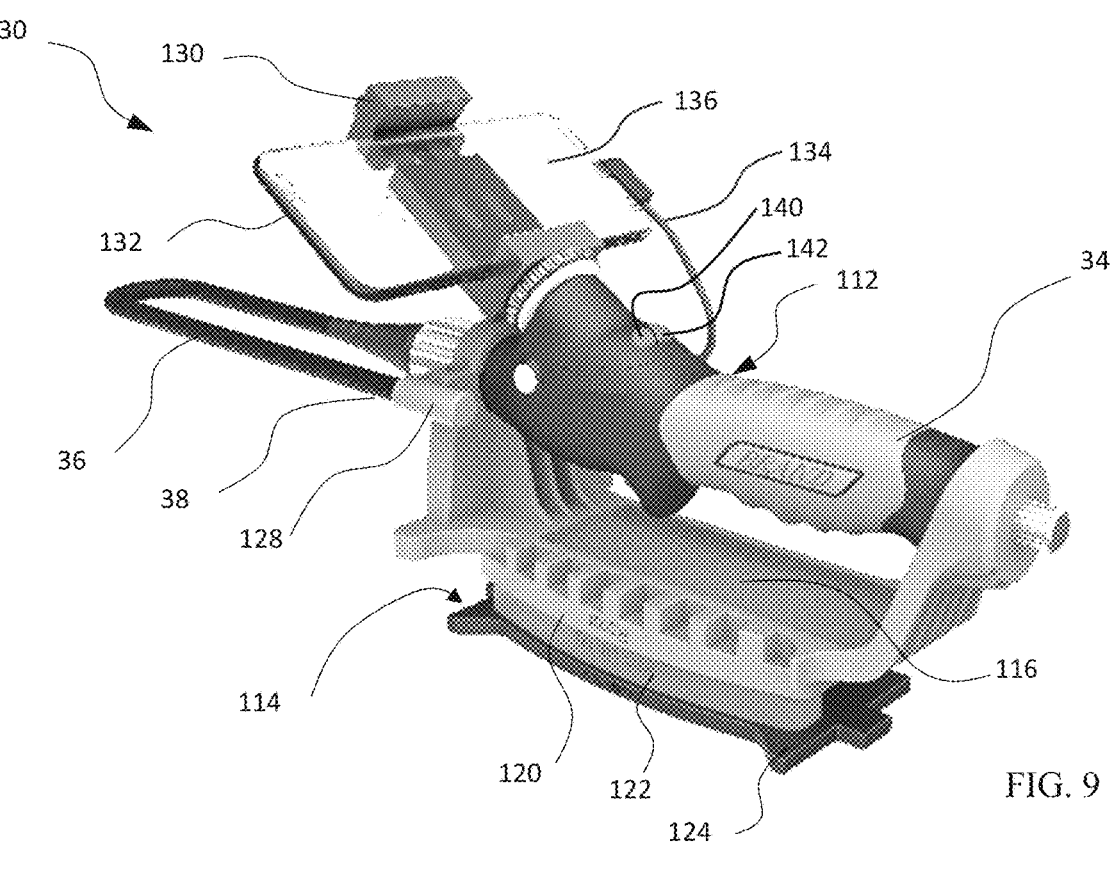
FIG. 9 is a perspective view of an alternate third embodiment of an inspection system of the present disclosure, having an alternate embodiment of an image capture device communicatively coupled to an image analysis system in the form of a smart handheld device by a communications cord.
Figure 10:
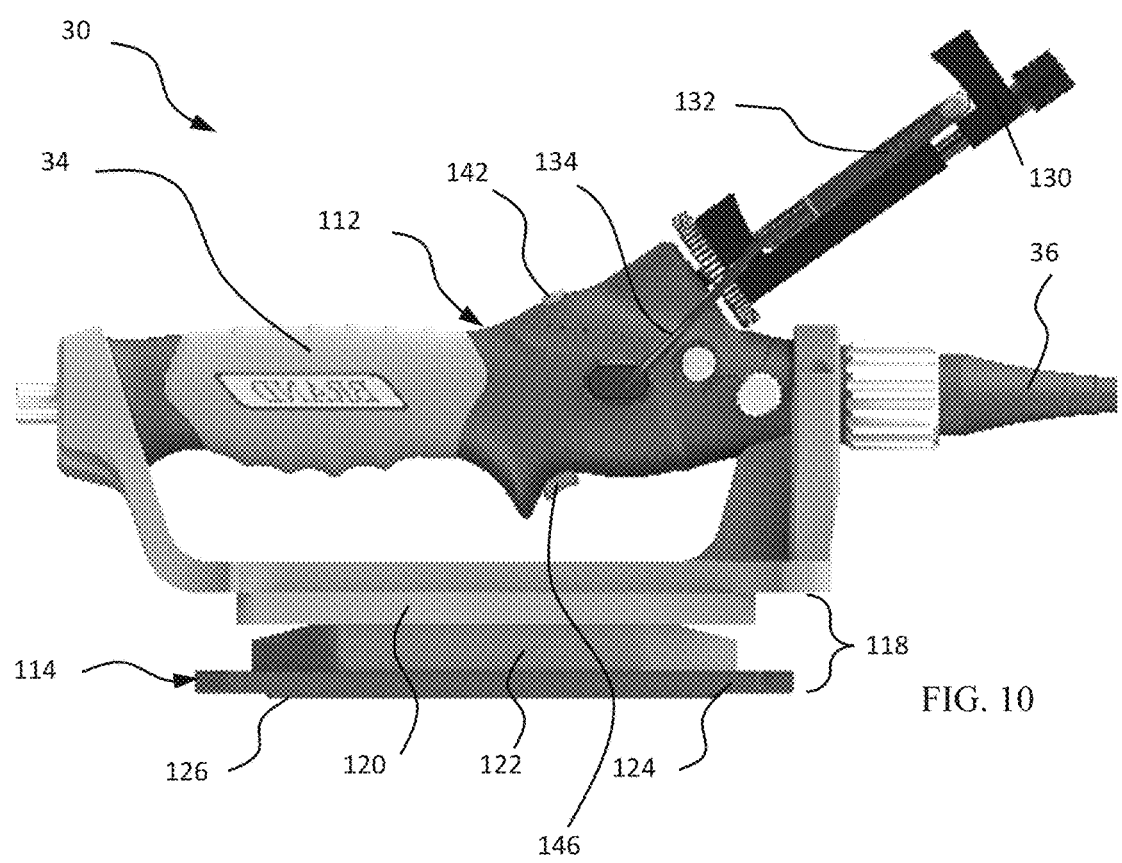
FIG. 10 is a side view of the inspection system of FIG. 9.
Figure 11:
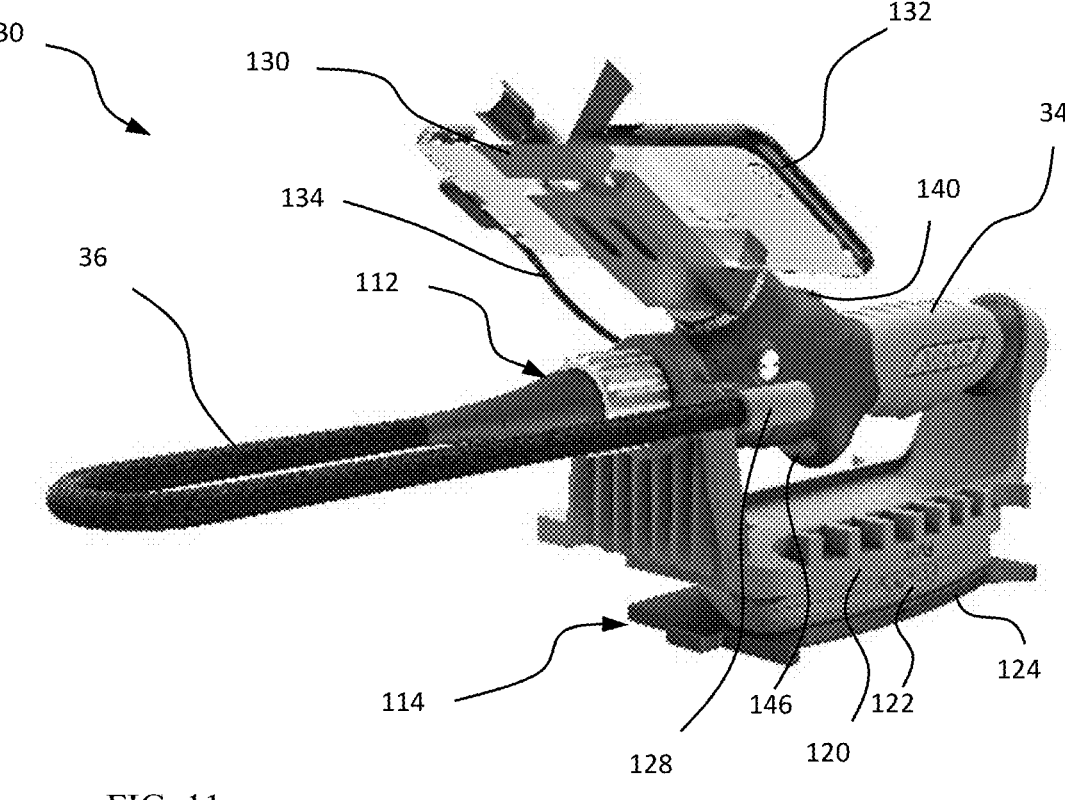
FIG. 11 is an alternate perspective view of the inspection system of FIG. 9.

Referring still to FIGS. 9-11, the handle 34 further has attached thereto a clamp 130 configured to support and secure a handheld smart device 132, such as a cell phone or tablet, to the handle 34. Many types and styles of clamps and/or holders for cell phones and tablets may be used to secure the smart device to the handle 34, besides a standard clamp 130, without departing from the scope of the present disclosure, and without the need to identify each of them in detail herein. For case of understanding, the smart device 132 will be referred to herein as a "cell phone 132" for the remainder of this exemplary embodiment, without limiting the smart device 132 to only including cell phones. The cell phone 132 is in communication with a processor 58 of the image capture device 112 by a communications cord 134 (i.e. such as a short jumper or pigtail cord) extending from the image capture device 112. The communications cord 132 is hard wired into the internal electronics of the image capture device 112, and is removably plugged into the cell phone 132 that is secured to the handle 34 by the clamp 130. The imaging capture device 112 in FIGS. 9-11 does not have its own display screen integrated into the handle or housing thereof as with the prior disclosed embodiments. Rather, in this embodiment, the image capture device 112 utilizes the display screen 136 of the connected cell phone 132 as the display screen on which to view the live images or video of what is within the imaging sensor's 38 field of view 40, and on which to view the digital images 94 captured or taken with the image capture device 112.

Moreover, in alternate embodiments (not shown), the image capture device 112 may also include one or more additional service lines or cords, or an electrical power supply jack, for example, electrical power cables or an AC electrical jack, which are each configured to be connected to an electrical wall outlet to supply external power to the image capture device 112. The image capture device may also include one or more data communications ports or network cables configured to connect to a communications network 70. In further alternate embodiments, the image capture device 112 can be untethered by any hardlines, hardwires, or cables and is instead powered by an internal electrical power supply, such as one or more disposable or rechargeable batteries, to power the inner electronics (e.g. processor, memory, computer-readable storage medium, etc.) that are needed to operate the light source 50, capture digital images with the imaging sensor 38, and other functions disclosed herein. However, in yet an additional alternate embodiment, such as that shown in FIGS. 9-11, the image capture device 112 may not have its own internal power supply integrated therein, and the electrical power needed to operate the image capture device 112, its inner electronics, and its functions as disclosed herein, may be supplied to it by the cell phone 132 (i.e. the internal battery within the cell phone) via the communications cord 134 connecting the image capture device 112 to the cell phone 132. In such embodiment, the communications cord 134 is a power supply and communications cord.

Figure 12:
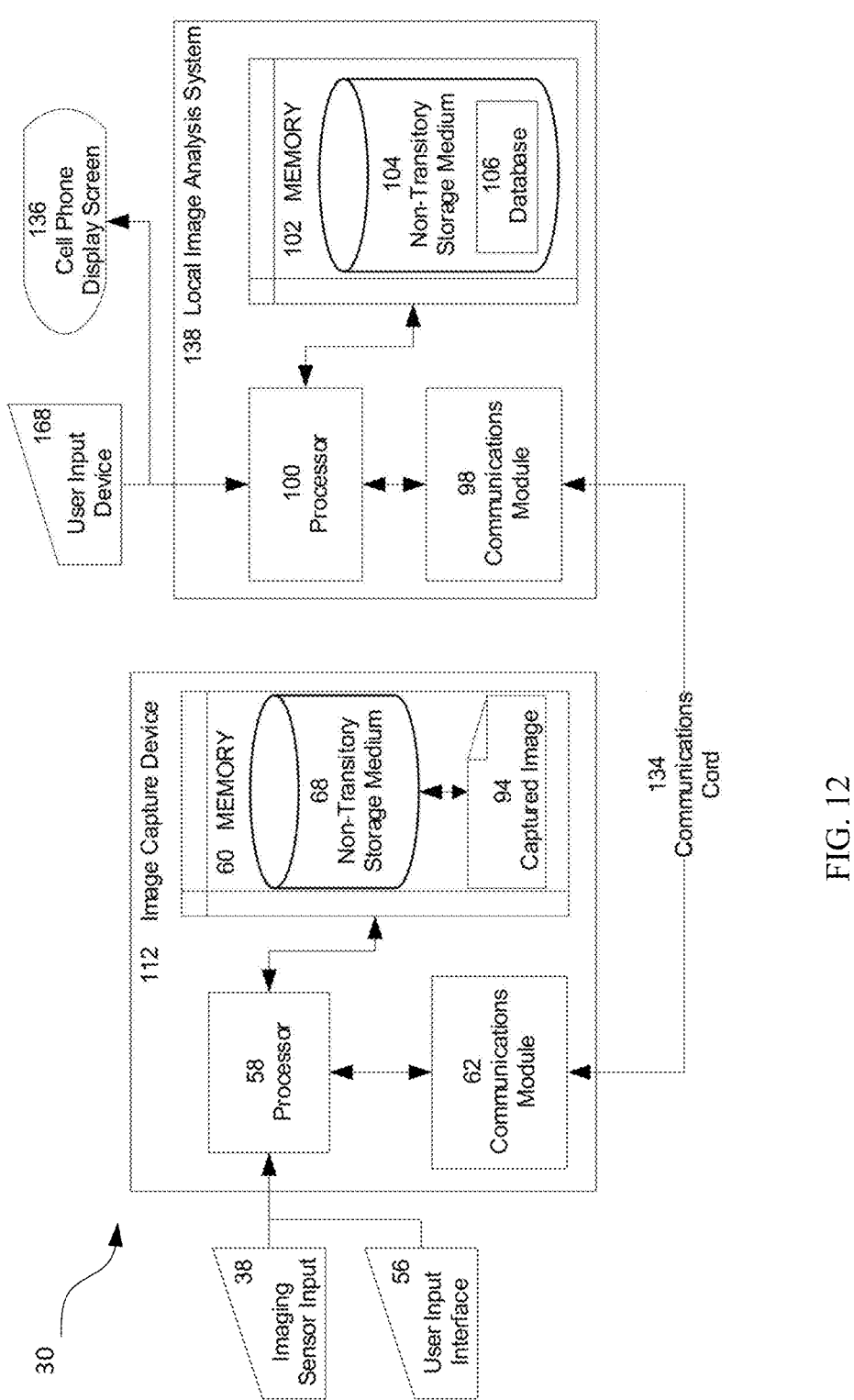
FIG. 12 is a schematic block diagram of the alternate third embodiment of an inspection system of FIG. 9, having an image capture device connected to an image analysis system embodied in a cell phone by a communications cord, and respective components thereof.

Referring still to FIGS. 9-11, and particularly also to FIG. 12, in this embodiment, the image capture device 112 is similar to the embodiment as disclosed in FIG. 8., in that the image capture device 112 itself does not include an image analysis module integrally embedded therein. Accordingly, it cannot on its own analyze images 94 taken therewith. Rather, in this embodiment shown in FIG. 12, as with the embodiment in FIG. 8, the image capture device 112 includes a computer processor 58, a memory 60, a communications module 62, and a non-transitory computer-readable storage medium 68 containing computer-executable programming instructions, which when executed by the processor causes the performance of one or more operations of a method of capturing a digital image 94 using the imaging sensor 38. In such alternate embodiment, the communications module 62 is configured to retrieve the captured and stored digital images from the storage medium 68 and send them to the cell phone 132 to which the image capture device 112 is connected via the communications cord 134. The cell phone 132 in this embodiment includes a program application saved therein containing executable instructions that are saved in one or more of the memory 102 or non-transitory storage medium 104 of the cell phone 132, and which when executed, carry out one or more operations for performing post processing and inspection analysis of the brake lining 20 based on the captured images thereof. Accordingly, the locally connected cell phone 132 and its program applications are together the image analysis system 138 of this embodiment. Consequently, the communications module 62 in the image capture device 112 is thus configured to communicate with one or more of a communications module 98 or a processor 100 of the image analysis system 138 and send the images 94 from one or more of the memory 60 or non-transitory storage medium 68 of the image capture device 112 to the image analysis system 138 to be analyzed therein. In this embodiment, the image analysis system 138 may further be connected to a customer records database or other such local or remote database via the communications network 70, (not shown) such as a LAN, WAN, broadband, Wi-Fi, Bluetooth, cellular network, or the like.

Referring still to the embodiment in FIGS. 9-11, the handle 34 includes a plurality of buttons. A first button 140 disposed on a first side of the handle 34 (i.e. a top side of the handle 34 in the embodiment shown in FIG. 9) that is configured to be pressed by a user's thumb is configured to change an intensity of the light emitted from the light source 50 at the distal end of the probe 36. A second button 142 for pressing by a user's thumb is disposed on the first side of the handle 34 adjacent the first button 140. The second button 142 is configured to toggle between activating the first imaging sensor 38 disposed on the side of the distal end of the probe 36, which as discussed above has a sideways field of view directed substantially perpendicular to the longitudinal axis of the distal end of the probe 36, and alternately activating the forward facing second imaging sensor 38 whose field of view is directed parallel to the longitudinal axis 42 of the distal end of the probe 36. A third button 146 is a trigger button disposed on an opposite rotational side of the handle than that at which the first and second buttons are located. The third button 146 is configured to trigger the imaging device 112 to take digital images, such as digital photographs, or laser scans, or the like, and transmit or send the digital images locally to the attached cell phone 132 for processing and analysis. In alternate embodiments, various physical or digital buttons may control various alternate functionalities of the image capture device 112 without departing from the scope of the present disclosure.

While the methods disclosed herein are equally applicable for use with any of the embodiments of an image capture device 32 or 112 disclosed herein, for simplicity, any further reference to an image capture device will be to the embodiment of the inspection system 30 using the image capture device 112 of FIGS. 9-12.

Figure 13:
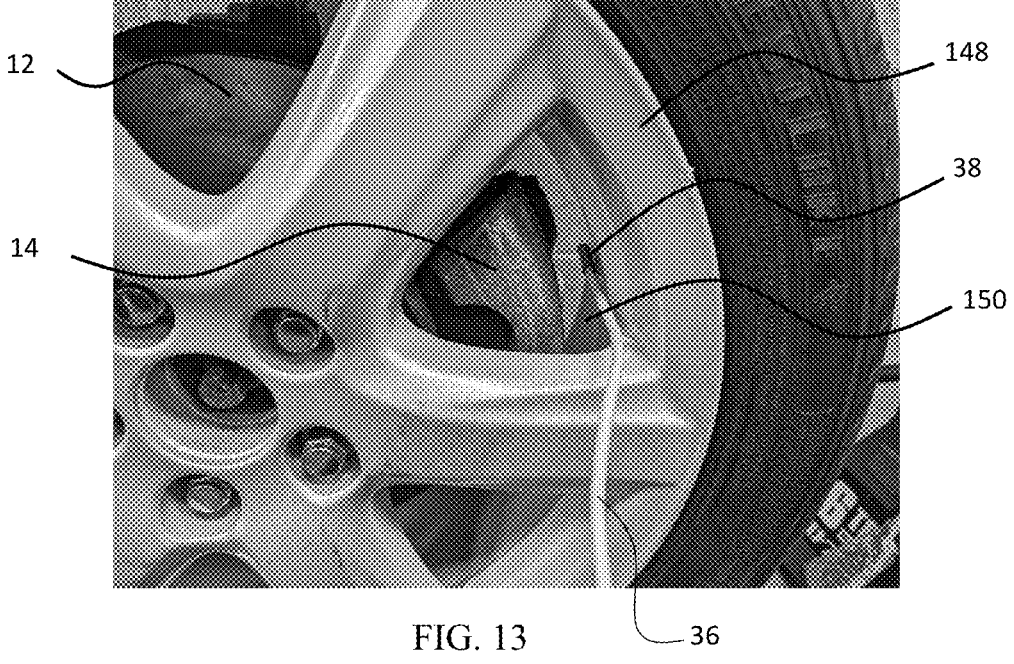
FIG. 13 is a schematic perspective view of a vehicle wheel showing a distal end of an embodiment of a probe of an image capture device of the present disclosure, placed in a first location such that an imaging sensor disposed at a distal end of the probe is located between an inner surface of a barrel of a vehicle wheel and an inspection hole formed in a brake caliper, through which inspection hole a side view of the brake lining and backing plate is visible to the imaging sensor of the image capture device.
Figure 14:
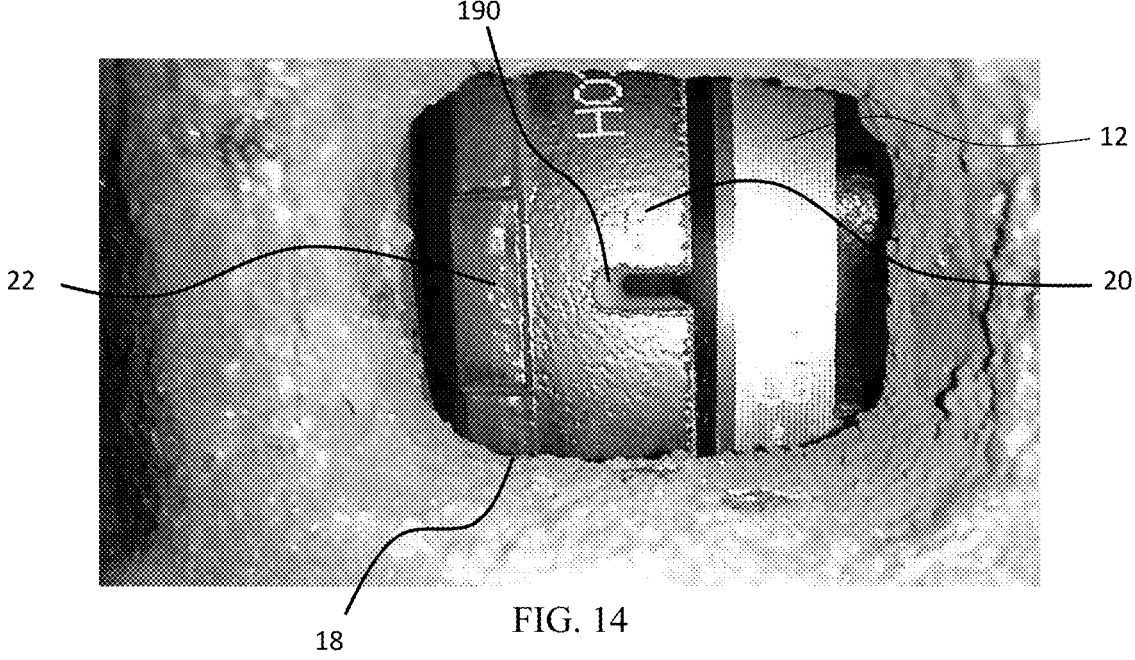
FIG. 14 is an embodiment of a digital image taken by an image capture device of the present disclosure when an imaging sensor is placed at the location shown in FIG. 13, the captured digital image showing a side view of the brake lining and backing plate and the respective thicknesses thereof.

Referring to FIGS. 13-14, in a broad description of an embodiment of a method of the present disclosure, the image capture device 112 is configured to be positioned with respect to a wheel 148 and/or brake rotor 12 of a vehicle, to enable the capturing of digital images 94, such as photographs, or scans of the side view of the brake lining 20 of the brake pad 16, showing the thickness of the brake lining 20. In one embodiment, as shown in FIGS. 13 and 14 to capture such digital images 94, an imaging sensor 38 of the image capture device 112 disposed at the end of a flexible probe 36 can be positioned between an inner surface of a barrel 150 of a vehicle wheel 148 and an inspection hole 18 formed in a brake caliper 14, through which inspection hole 18 a side view of the brake lining 20 is visible and shows a remaining thickness of the brake lining 20 of the brake pad 16. A live view of the that which is visible in the field of view 40 of the imaging sensor 38 is shown on the display screen 54, 136 for the image capture device 32, 112, for example on the display screen 136 of the handheld smart device or handheld computing device 132 in the embodiment shown in FIGS. 9-11. The image capture device can then be triggered, for example by pressing one of the buttons 142, 144, 146 on the handle 34 of image capture device 112, or the buttons on the user input interface 56 of the image capture device 32, or selecting a digital button on the display screen 54, 136 of the image capture device 32 (FIG. 4) or handled computing device 132 (FIG. 9), to cause the imaging sensor to capture a digital picture or image of a side view of the brake lining 20 through the inspection hole 18 in the brake caliper 14. FIG. 14 shows an exemplary digital image captured by the image capture device 32, 112 when the imaging sensor 38 and probe 36 are placed as shown in FIG. 12.

Figure 15:
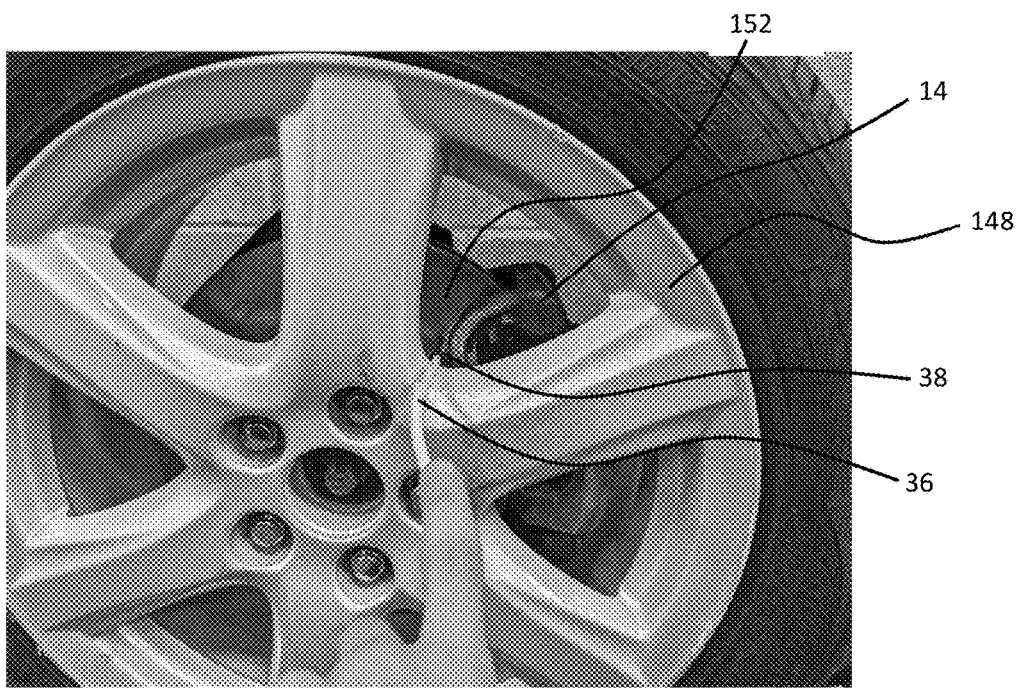
FIG. 15 is a schematic perspective view showing an alternate embodiment of a distal end of a probe of an image capture device of the present disclosure, placed in a second location such that the imaging sensor of the probe is disposed flush against an outer braking surface of a brake rotor, so that the field of view of the imaging sensor is directed along the braking surface of the rotor and towards the direction of the brake lining and backing plate, in which a side view of the brake lining and backing plate is visible to the imaging sensor of the image capture device.
Figure 16:
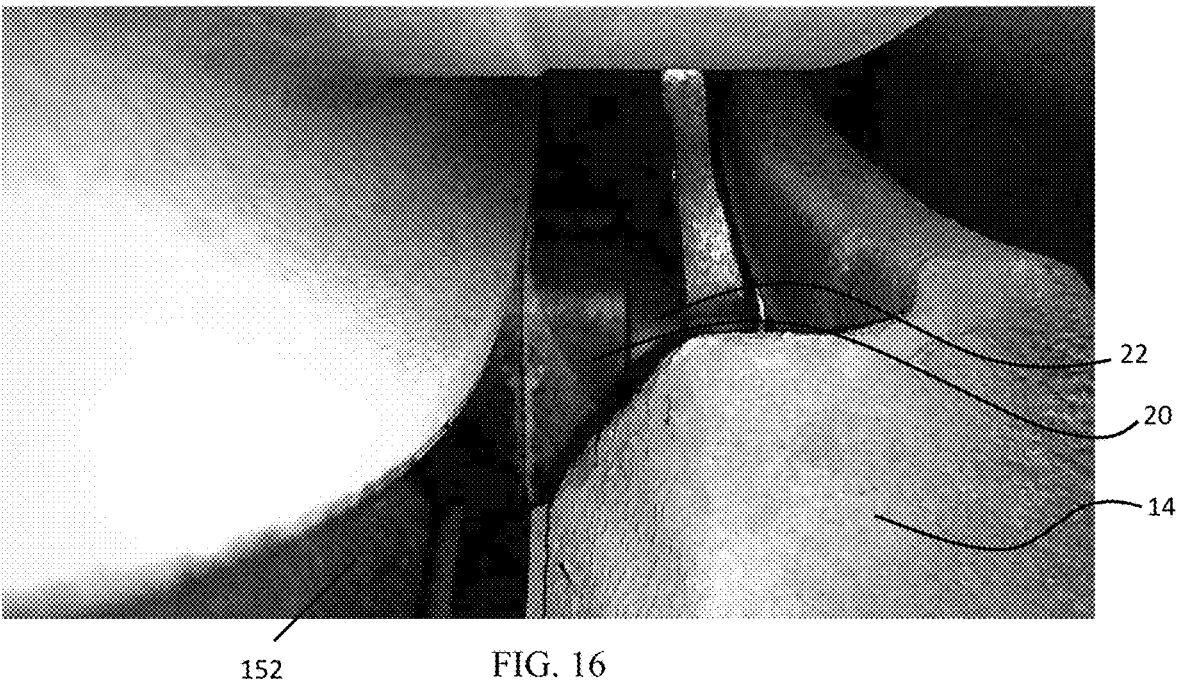
FIG. 16 is an alternate embodiment of a captured digital image taken by the image capture device of the present disclosure when the imaging sensor is placed at the location shown in FIG. 15, the captured digital image showing a side view of the brake lining and backing plate and the respective thicknesses thereof.

Referring to FIGS. 15-16 (and the embodiment of the image capture device 112 of FIGS. 9-11), in an alternate embodiment, a distal end of the imaging sensor 38 of the image capture device 112 can alternatively be placed adjacent or directly against an outer braking face 152 of the brake rotor 12, with the imaging sensor 38 having a field of view 40 directed perpendicular to the longitudinal axis 42 of the distal end of the probe 36, perpendicular to the rotational axis of the brake rotor 14, and generally parallel to the braking face 152 of the rotor 12 toward the direction of the brake lining 20 and backing plate 22. Referring to FIG. 15, in this manner, the imaging sensor 38 has within its field of view 40 the side view of the brake lining 20 of the brake pad 16, showing the thickness of the brake lining 20 and backing plate 22, and a digital image 94 thereof can be captured by the imaging sensor 38. FIG. 16 shows an exemplary schematic view of a digital image captured by the image capture device 112 when the imaging sensor 38 is placed as shown in FIG. 15, and which can be captured as a digital image thereof. In either embodiment, in which the imaging sensor 38 of the image capture device 112 is positioned in either of the arrangements as shown in FIG. 13 or 15, it is possible to capture digital images 94 of a side end view of the brake lining 20 and backing plate 22, showing the thickness of the brake lining 20 and the thickness of the backing plate 22 to which the brake lining 20 is attached, affixed, or bonded, without removing the wheel 148 of the vehicle.

Those captured digital images 94 of the side view of the brake lining 20 and backing plate 22 are then sent to, brought into, opened, or loaded in the image analysis system 138 where a selected digital image 94 of the side view of the brake pad 16 can be displayed or opened up on a display screen 136 thereof for viewing and/or manipulation by a user of the inspection system 30. For clarity, any reference herein to the functionality of any embodiment of an image analysis system disclosed herein is equally applicable to all embodiments of an image analysis system herein, or to an internal image analysis module integrated into an image capture device, without departing from the scope of the present disclosure.

Once a selected digital image 94 is loaded on a display screen 136 for viewing, the image analysis system 138 is instructed, either automatically or via user control, to overlay a series of at least three visual markers 154, 156, 158 on the digital image 94 of the side view of the brake lining 20. The markers 154, 156, 158 are then each aligned with specific designated edge locations of each of the brake lining 20 and backing plate 22 shown on the captured digital image 94. Alignment of the various markers 154, 156, 158 with the brake lining and backing plate edges in the image 94 is performed either manually by user manipulation of each such digital marker on the display screen 136, or automatically by the inspection system 30 through automated edge detection functionality (either with, or without, first viewing the captured digital image 94 in an analysis GUI displayed on the display device). The markers 154, 156, 158 are then used to indirectly measure a relative thickness of each of the brake lining 20 and the backing plate 22 from/in the image 94, and determine a calculated ratio between the remaining thickness of the brake lining 20 and the thickness of the brake pad's backing plate 22. In one embodiment, a determination is then made, based primarily on the calculated ratio and a comparison to a threshold value, as to whether the relative thickness of the remaining brake lining 20 has become too thin as compared to the relative thickness of the backing plate 22, such that the brake pads 16 have become unsafe for continued use and must be replaced, or conversely whether there is still sufficient remaining thickness to the brake lining 20 such that the brake pads 16 are still safe to operate in their current condition.

Referring to FIGS. 13-16, as discussed above, in one embodiment, the image capture device 112 is configured to capture digital images 94 of a side view of the brake pad through the inspection hole 18 in the brake caliper 14, in which the captured images 94 are taken from a direction that is perpendicular to a rotational axis of the brake rotor 12 (as shown in FIGS. 12 and 14), and aligned substantially parallel to a side view of the brake pad 16. In this manner, the captured images 94 are oriented to show the thickness of the brake lining 20.

Referring to FIGS. 9-12, as discussed above, in one embodiment, the imaging sensor 38, such as a digital camera, is configured to capture one or more of static or still digital images or photographs, scans, and/or record live video footage, in response to a user initiated trigger, for example depressing the third button 146 on the handle 34, or the like. In another related embodiment, the imaging sensor 38 may be a laser imaging sensor, such as for example a laser scanner capable of mapping out the shapes of scanned objects and detecting the edges of scanned objects. In this regard, the laser scanner may also be configured to identify a leading edge 160 and a trailing edge 162 of the brake pad backing plate 22 and/or a leading edge 164 and a trailing edge 166 of the brake lining 20, in the thickness direction of the brake lining. In such an embodiment, a laser scanner would be capable of detecting a trailing edge 166 of the brake lining 20, which corresponds to a back surface of the brake lining 20 attached to the backing plate 22 of the brake pad 16, as well as detecting the leading edge 164 of the brake lining 20 corresponding to the braking surface of the brake lining 20.

As discussed above, the inspection system 30 of the present disclosure includes an image analysis system 138 configured to analyze images 94 of a side view of the brake lining showing the thickness thereof, which images 94 were captured and sent to the image analysis system 138 by the image capture device 112. As discussed, the image analysis system 138 is a computer, computerized device, or handheld computerized device, such as the cell phone 132 shown in FIGS. 9-11, containing computer-executable programming instructions for performing operations of a method of inspecting a brake pad, or brake lining of a brake pad. The image analysis system 138 includes or utilizes a display screen 136 and a user input device 168, such as a keyboard, a touch screen interface of the display screen 136 of the cell phone 132, a mouse, stylus, or the like that are input devices for an on-screen graphical user interface (GUI) 170 displayed on the display screen 136. In some embodiments, as in this embodiment, the user input device 168 of the image analysis system 138 and the output display device 136 may be the same component, such as in the case of a cell phone touch screen display 136 that is used both to provide inputs to the image analysis system 138 and view the output results of the analysis.

The communications module 98 of the image analysis system 138 is configured to receive from the communications module 62 of the image capture device 112, one or more captured images 94 of a side view of a brake pad's brake lining 20. This captured image 94 is then stored in the non-transitory computer readable storage medium 104 of the image analysis system 138 so it may be recalled later. The processor 100 of the image analysis system 138 is configured to execute computer readable instructions stored in one or more of the storage medium 104 or memory 102 of the image analysis system 138. The instructions, when executed or initiated, first open an analysis GUI 170 on the display screen 136 of the image analysis system 138. Referring to FIG. 17, the analysis GUI 170 is configured to allow a user to select one digital image 94, from a plurality of stored captured images 172 of brake linings, to be recalled from the non-transitory storage medium 104, and loaded into the analysis GUI 170 for viewing by a user or technician. Referring to FIG. 18, the analysis GUI 170 includes a captured image viewing window 174 (or an image analysis window) into which a selected captured image 97 of a brake lining is loaded, and over which captured image a grid 176 is overlayed by the image analysis system 138. The grid 176 includes a plurality of horizontal and vertical lines spaced apart at discrete uniform distances to form the grid 176. In sone embodiments, the distance between the parallel vertical and horizontal lines of the grid overlay is adjustable by a user of the analysis system to make them closer together (i.e. a smaller grid spacing) or farther apart (i.e. a larger grid spacing).

Referring still to FIG. 18, in one embodiment, the captured image 94 displayed in the viewing window 174 of the analysis GUI 170 is rotatable and movable within the viewing window to center the objects of interest (e.g. the brake lining and backing plate) therein, and may also be zoomed in or out. The lines of the grid 176 that was overlayed on the captured image 94 serve to aid a user in aligning the trailing edges 162, 166 and leading edges 160, 164 of the backing plate 22 and brake lining 20 in the captured image 94 of the brake pad 16, with the vertical lines in the grid overlay 176. In this manner, if the captured images 94, when first loaded and displayed in the analysis GUI 170, are oriented such that one or more of the leading and trailing edges of the brake lining and backing plate are shown disposed at an angle to the grid lines (as in FIG. 17), in which the edges are neither parallel nor perpendicular to the grid lines, then the image 94 can be rotated until such edges of the brake lining 20 and backing plate 22 are oriented in a substantially vertical direction parallel to the vertical lines of the grid overlay, as depicted in FIG. 19. In this manner, this will also then orient the thickness direction of the brake lining to be aligned in the horizontal direction, parallel to the horizontal lines of the grid 176 overlay. In one embodiment, as shown in FIG. 18, the captured image 94 may be rotated on a touch screen by gesture control, such as for example by placing two fingers on the touch screen at two separate points 178 and dragging or rotating one finger on the screen relative to the other finger. In another embodiment, the captured image 94 may be rotated, moved, and zoomed in using a computer mouse, stylus, or other input. In another embodiment, the analysis GUI 170 may include onscreen text-based instructions 180 directing the user to perform any one of centering, rotating, and/or zooming the displayed captured image 94 as necessary.

Referring to FIGS. 18-20, the analysis GUI 170 may also include a first onscreen selectable digital button 182 that, when selected by a user via the user input device 168, for example by a finger or stylus touch on the button 182 if displayed on a touch screen, or selection by a click of a computer mouse on the button, initiates the display of a plurality of movable markers 154, 156, 158 overlayed on both the captured image 94 of the brake lining 20 and the grid overlay 176. The selectable first digital button 182 may be labeled with text such as "Show Markers" or some similar text phrase indicating the function of the button at that moment when selected. However, in alternate embodiments, the plurality of markers 154, 156, 158 may automatically appear onscreen once the selected image 94 is loaded into the viewing window of the analysis GUI, without departing from the scope of the present disclosure.

Figure 21:
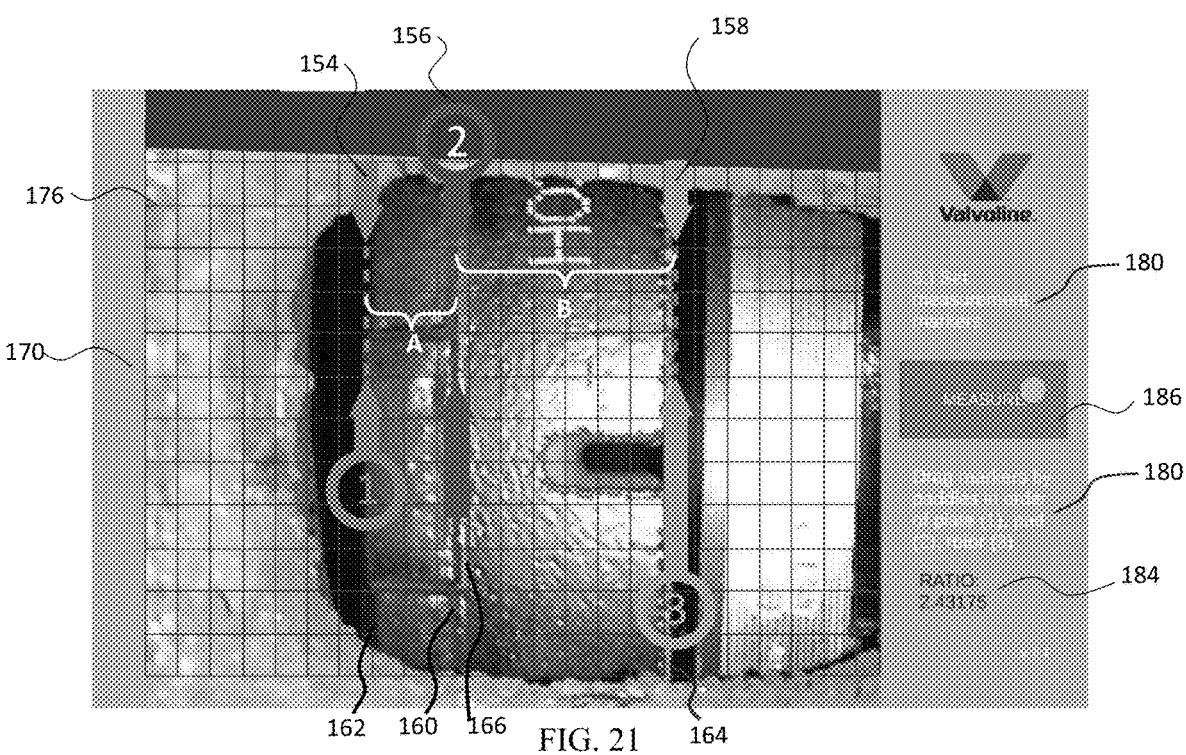
FIG. 21 is a screenshot of an embodiment of the analysis GUI displaying the captured digital image, as shown in FIG. 20 after the plurality of markers have been moved to respectively mark and identify each of a trailing edge of the backing plate, the leading edge of the backing plate, and the leading edge of the brake lining, and in which the linear pixel count thickness dimensions A and B of the backing plate and brake lining are respectively shown.

Referring to FIGS. 20 and 21, in one embodiment, there are three digital markers 154, 156, 158, in the form of vertical lines that are each identified by a different identifier, such as a different number (e.g. "1", "2", and "3"), that will appear overlayed on top of the grid overlay 176 in the analysis GUI 170 displayed on the display screen 54. The markers 154, 156, 158 are used to respectively mark each of a trailing edge 162 of the brake pad backing plate 22, the leading edge 160 of the backing plate 22 that also corresponds to the trailing edge 166 of the brake lining 20 (where the leading face of the backing plate and trailing face of the brake lining are bonded to each other), and the leading edge 164 of the brake lining 20. In another embodiment, the analysis GUI 170 may include onscreen text-based instructions 180 (see FIGS. 20 and 21) directing the user to move one or more specific markers 154, 156, 158 to specific locations shown on the captured image.

In the embodiment shown in FIGS. 20 and 21, the markers 154, 156, 158 can be aligned manually by a user of the inspection system, in which each marker 154, 156, 158 is slidably moved one at a time on the display screen 136 by user input. The analysis GUI 170 may include onscreen instructions 180 indicating the order and location at which each such marker 154, 156, 158 should be placed. In this regard, in the case of a touch screen, a user can use a finger or stylus touch to slidably move each marker 154, 156, 158 onscreen to the desired locations on the digital image 94 marking the leading and trailing edges 160, 162 of the backing plate 22 and the leading and trailing edges 164, 166 of the brake lining 20. In alternate embodiments, a user may use a computer mouse to move an onscreen pointer over a given marker, click the mouse button to grab the marker, and drag the mouse to correspondingly move the onscreen marker to the desired locations at which the edges 160, 162, 164, 166 are found on the captured image 94. In still alternate embodiments, the analysis GUI 170 may scan the captured image 94 upon the image 94 being loaded into the viewing window 174 and the image analysis system may automatically place the markers 154, 156, 158 at the desired locations corresponding to the displayed edges 160, 162, 166 of the backing plate and brake lining, through automated edge detection functionality, for example by the use of artificial intelligence (i.e. AI), and without intervention by the user. Such an AI-based system is configured to learn over time, from the prior repeated manual placement of the markers 160, 162, 164 on similar captured images, where the edges 160, 162, 164, 166 to be marked are located in future similar captured images. If necessary, a user may always manually adjust the positioning of the automatically placed markers 154, 156, 158.

In the embodiment shown in FIGS. 20 and 21, there are three markers 154, 156, 158 to be placed on the captured image 94 of the side view of the brake lining 20 and backing plate 22. The first marker 154, identified in FIGS. 20 and 21 with a number "1" in a circle at an end of the vertical marker, is to be aligned as shown in FIG. 21 with a trailing edge 162 of the brake pad's backing plate 22 that is substantially parallel to the backing plate's trailing face, and on which trailing face the pistons of the caliper (not shown) act to engage the brakes with the rotor. The second marker 156, identified in FIGS. 20 and 21 with a number "2" in a circle at the end of the vertical marker, is to be aligned as shown in FIG. 21 with the leading edge 160 of the backing plate 22 that also corresponds to the trailing edge 166 of the brake lining 20 (where the leading face of the backing plate and trailing face of the brake lining are bonded to each other). And the third marker 158, identified in FIGS. 20 and 21 with a number "3" in a circle at the end of the vertical marker, is to be aligned as shown in FIG. 21 with a leading edge 164 of the brake lining 20 that is substantially parallel to the braking surface of the brake lining 20 that acts against the rotor during braking.

Figure 22:
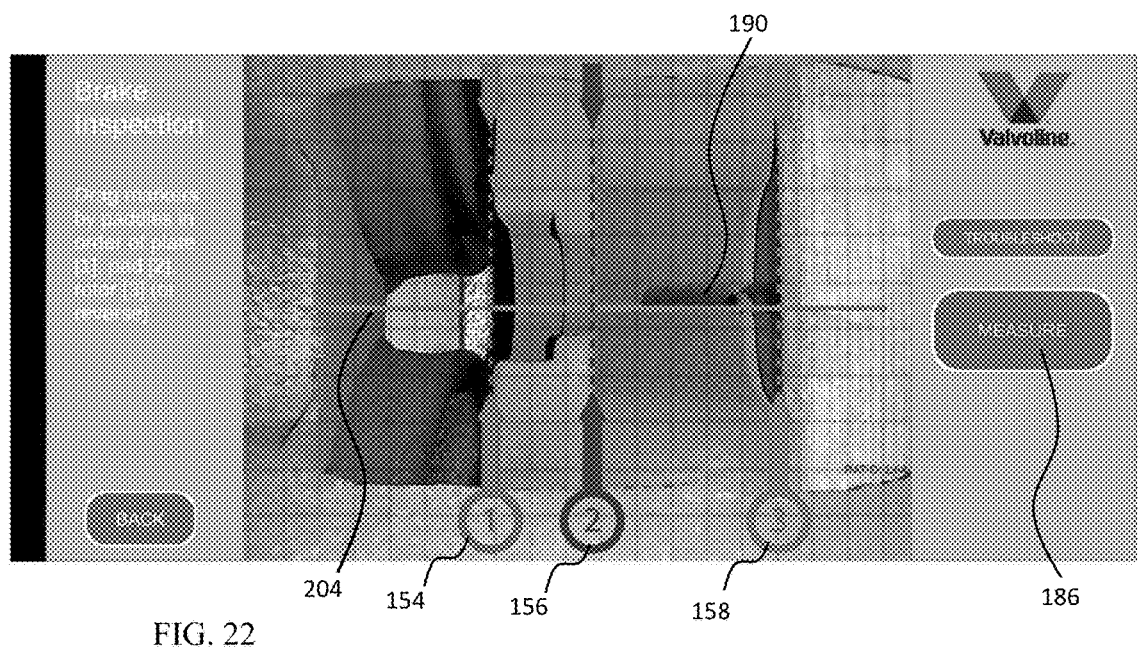
FIG. 22 is an alternate embodiment of a screen of an analysis GUI, showing a different digital image of a different brake pad and caliper from a different vehicle, than that shown in FIG. 21.

Referring to FIG. 22, an alternate embodiment of the analysis GUI 170 is depicted with a slightly different layout and location of buttons and onscreen instructions, and with a digital image of a different brake pad and rotor from a completely different vehicle than that shown in FIGS. 19-20 loaded in the viewing window. In such embodiment, the markers 154, 156, 158, have been placed as instructed and are ready for measurements to be taken in a next step.

In one embodiment, the image analysis system 138 continuously identifies and/or tracks the horizontal pixel location in the captured image viewing window 174 at which each of the three markers 154, 156, 158 is located or positioned onscreen in the analysis GUI 170, and can further determine or calculate a distance between any two of the three markers 154, 156, 158 in the horizontal direction. The distance calculation is agnostic of both a true measurement distance (i.e. how many centimeters, millimeters, inches, etc. between any two markers) and the true scale of the captured image displayed behind the overlayed markers. Instead, the calculated or determined distance between any two markers 154, 156, 158 is a measurement of the number of adjacently aligned pixels in the digital image, located along a straight line in the horizontal direction, between each of the two markers. While alignment of the edges and markers, and distance determinations between markers, is discussed above with the edges and markers aligned in the vertical direction and measurements determined/calculated between markers in the horizontal direction, in alternate embodiments, the system and methods still work the same if the edges and markers are aligned horizontally and distance measurements are made in the vertical direction, without departing from the scope of the present disclosure.

Referring again to FIG. 21, for example, a measurement "A" of the distance between the first marker 154 and the second marker 156, which respectively mark each of the trailing edge 162 of the backing plate and the leading edge 160 of the backing plate, is a determination or calculation of the number of adjacently aligned pixels located along a straight line in the horizontal direction between the first marker 154 and second marker 156. In this regard, measurement "A" represents the thickness of the backing plate 22 displayed in the captured image shown in the analysis GUI 170, as measured in linear pixels (i.e. measurement A is a pixel-count thickness of the backing plate 22 as shown in the captured digital image 94). A measurement "B" of the distance between the second marker 156 and third marker 158, which respectively mark each of the trailing edge 166 of the brake lining (also the leading edge of the backing plate as discussed above) and the leading 164 edge of the brake lining, is a calculation of the number of adjacently aligned pixels, located along a straight line in the horizontal direction, between the second and third markers 156, 158. In this regard, measurement B represents the thickness of the brake lining 20 as displayed in the captured image 94 shown in the analysis GUI 170, as measured in linear pixels (i.e. measurement B is a pixel count thickness of the brake lining 20 as shown in the digital image 94). Accordingly, the measurements A and B are indirect representational measurements of the thickness of each of the backing plate 22 and the brake lining 20, as measured in pixels based on the onscreen captured image 94, and are not direct measurements of either the backing plate 22 or brake lining 20 thicknesses. In this regard, because the measurements A and B are a pixel count measurements of the thickness of the brake lining 20 and backing plates 22 as shown in the image 94, and such measurements can and/or will change based on how zoomed-in the captured image 94 is shown on screen (or how close the imaging sensor was to the brake pad when the digital image 94 was taken), the measurements A and B are agnostic of the actual real-world thicknesses of each of the brake lining and backing plate that may be shown in a digital image 94 thereof.

Referring again to FIGS. 20-21, in one embodiment, once the markers 154, 156, 158 are displayed on the analysis GUI 170, the image analysis system 138 is continuously tracking the location of each of the three markers 154, 156, 158, and determining the measurements A (i.e. the pixel count measurements between the first and second markers 154, 156) and B (i.e. the pixel count measurements between the second and third markers 156, 158). In one embodiment, once the markers 154, 156, 158 are displayed on the analysis GUI 170, the image analysis system is continuously identifying the horizontal pixel location at which each of the markers are positioned, continuously determining (or calculating) the measurements A and B based on the identified locations of each such marker, and/or displaying on the analysis GUI, a ratio 184 between measurement A and measurement B. The ratio 184 can be calculated as the ratio of measurement B to measurement A (i.e. Ratio=B/A), or the ratio of measurement A to measurement B (i.e. Ratio=A/B). Accordingly, in one embodiment, as the markers are moved manually by a user of the system to align with various of the edges 160, 162, 164, 166 of the backing plate 22 or brake lining 20, the ratio 184 of A/B or B/A is also displayed on screen and changing in real time. In the embodiments depicted in FIGS. 19-20, the ratio 184 depicted in the analysis GUI 170 is calculated as the ratio of measurement B to measurement A (i.e. Ratio=B/A).

In one embodiment, the image analysis system 138 has stored therein one or more threshold ratio values defining a limit between a first range of ratio values A/B or B/A and a second range of ratio values A/B or B/A. The first range of ratio values define ratio values within which the remaining thickness of the brake lining is considered to be acceptable and safe for continued operation of the brake system and vehicle, in comparison to the thickness of the backing plate. Brake pads that have been inspected by the method disclosed herein and are found to have a calculated ratio falling in this first range are considered to have passed inspection, and do not require replacement. The second range of ratio values define ratio values within which the remaining thickness of the brake lining is considered to be unacceptable and/or unsafe for continued operation of the brake system and vehicle, in comparison to the thickness of the backing plate. Brake pads that have been inspected by the method disclosed herein and are found to have a calculated ratio falling in this second range are considered to have failed inspection, and require replacement accordingly. In other words, the threshold ratio value defines the limit to the first range of ratio values, outside of which first range, a calculated ratio A/B or B/A for a given brake pad would be considered unsafe to operate the brake system and vehicle. Thus, a determination as to whether a given brake lining or brake pad has either passed or failed its inspection is primarily based on the determined or calculated ratio between the respective thicknesses of the brake lining and backing plate of the brake pad.

In one embodiment, in which a ratio A/B (i.e. the pixel count thickness of the backing plate divided by the pixel count thickness of the brake lining) is determined and displayed in the analysis GUI 170 by the image analysis system 138, the threshold value may be a number below which there is still sufficient remaining brake lining 20 thickness such that it is still safe to operate the vehicle and brake system, and above which value it is no longer safe to operate a vehicle.

In an alternate embodiment, in which a ratio B/A (i.e. the pixel count thickness of the brake lining divided by the pixel count thickness of the backing plate) is determined and displayed in the analysis GUI 170 by the image analysis system 138, the threshold value may be a number above which there is still sufficient remaining brake lining 20 thickness such that it is still safe to operate the vehicle and brake system, and below which value it is no longer safe to operate a vehicle.

Figure 28:
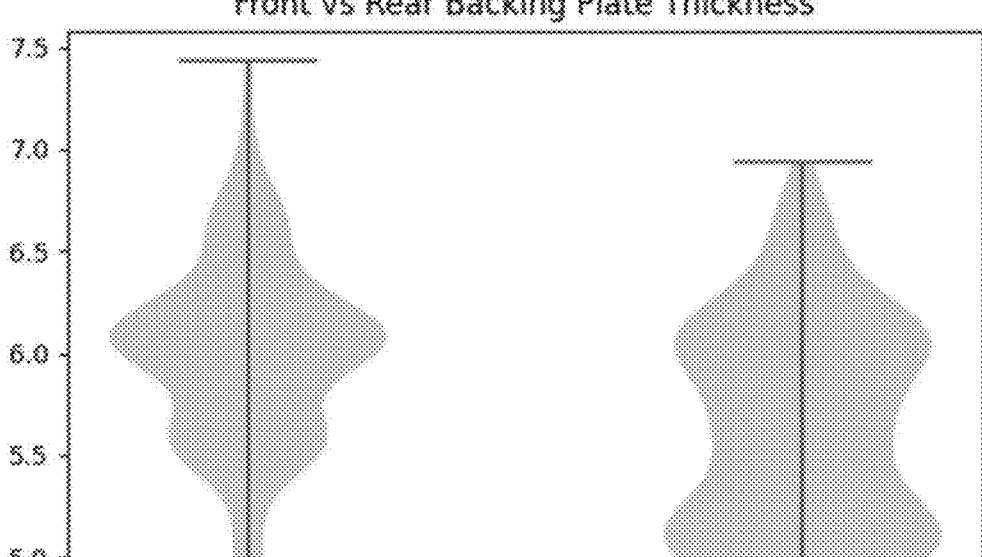
FIG. 28 is a schematic graph showing an exemplary empirical distribution of actual backing plate thickness measurements taken for a large sample size of brake pads.

In one embodiment, a measured average backing plate thickness can be used to convert the calculated ratio from the digital image, to a calculated brake lining thickness. In such an embodiment, the inventors have manually measured the thickness of backing plates from a large number of different brands and models of brake pads in the industry and have found that backing plate thickness vary somewhat between brake pads to be installed on the front calipers of a vehicle and brake pads to be installed on the rear calipers of the vehicle. Referring to FIG. 28, a graph shows the distribution of backing plate thickness measurements taken by the inventors on a large number of brake pads to be installed on each of front calipers and a rear calipers. As can be seen in FIG. 28, the actual measured backing plates thickness varies from between about 5-7 mm for brake pads intended to be mounted to front calipers, to about 4.5-7 mm for brake pads intended to be mounted to rear calipers. Thus, we can also see in FIG. 28 that the average backing plate thickness of all front brake pads in the sample pool is therefore larger, at about 6.1 mm, than it is for all rear brake pads in the sample pool whose average backing plate thickness is about 5.8 mm. Thus, the inventors have shown that the average backing plate thickness for front brake pads is different than the average backing plate thickness for rear brake pads. The method disclosed above can therefore apply this observation to enhance the accuracy of the brake pad inspections and determination of the remaining brake lining thickness for each brake pad, as between the front and rear brake pads, and therefore a more accurate determination of whether the brake lining has passed or failed the inspection.

To do so, for a front brake pad being inspected by a method herein, the calculated ratio of the brake lining thickness to the backing plate thickness (as measured by the markers in the GUI; Ratio=B/A) is multiplied by the observed average backing plate thickness of 6.1 mm for front brake pads, which generates a calculated remaining brake lining thickness of that front brake pad in millimeters, which is still based on the original calculated ratio from the digital image. And similarly, for a rear brake pad being inspected by a method herein, the calculated ratio of the rear brake lining thickness to its backing plate thickness (as measured by the markers in the GUI; Ratio=B/A) is multiplied by the observed average backing plate thickness of 5.7 mm for rear brake pads, which generates a calculated remaining brake lining thickness of that rear brake pad in millimeters, which is all still based on the original calculated ratio from the digital image. An equation for the calculated brake lining thickness is provided below:

$$CBLT = (B/A) \times ABP,$$

where
  "CBLT" is the calculated brake lining thickness in millimeters.
  "B/A" is the ratio, calculated by the image analysis system, of the pixel count thickness of the brake lining in the digital image, to the pixel count thickness of the backing plate in the digital image, as determined by placement of the markers on the digital image.
  "ABP" is the measured average backing plate thickness, where:
    For inspection of a front brake pad, ABP=6.1 mm
    For inspection of a rear brake pad, ABP=5.7 mm
  The average backing plate thickness (ABP) values for each of the front and rear brakes are stored locally in the image analysis system. When the user chooses in the analysis GUI 170 which of the vehicle's front or rear brake pad are to be inspected, the image analysis system automatically uses the appropriate ABP value based on whether the user selected in the image analysis GUI a front or rear brake pad to inspect. The calculated brake lining thickness (CBLT) in millimeters is then compared to a threshold value of a generally accepted minimum safe brake lining thickness to determine whether the brake lining has sufficient calculated thickness left for safe operation of the vehicle, or if the brake lining's calculated thickness is too thin thus requiring the brake pad to be replaced. If the calculated thickness is above the threshold minimum thickness value, the front brake pad has passed inspection and it is still safe to operate the vehicle without replacing the brake pad. If the calculated thickness is below the threshold value, the brake pad has failed inspection and the brake pad must be replaced.

In an alternate embodiment of an enhanced accuracy inspection method, the average backing plate thickness in the immediately preceding embodiment and equation could be replaced by an actual backing plate thickness value, that could be provided to the image analysis system by the vehicle manufacturer, the brake manufacturer, or another third part data provider who has a database of such actual backing plate thicknesses for each of the front and rear brakes.

In yet still another alternate embodiment of an enhanced accuracy inspection, because the image analysis system of the previous two embodiments calculates a remaining brake lining thickness by multiplying the ratio generated from the markers on the digital image by an average backing plate thickness value (ABP), any deviation of a brake pad's actual backing plate thickness from the fixed ABP value will increase error in the calculated remaining brake lining thickness and reduce accuracy/precision in the inspection. Accordingly, to minimize this error, in the present embodiment the above discussed average backing plate thickness (ABP) could be multiplied by a correction factor (cF) to compensate for small differences in backing plate thickness using specific OEM manufacturer data. Doing so would adjust the average backing plate thickness closer to the actual backing plate thickness of a brake pad on a given target vehicle, thereby achieving an even more accurate determination as to the calculated thickness of the remaining brake lining on the inspected brake pad. Such a modified equation would be as follows:

$$CBLT = (B/A) \times (cF \times ABP),$$

where
  "CBLT" is the calculated brake lining thickness in millimeters.
  "B/A" is the ratio, calculated by the image analysis system, of the pixel count thickness of the brake lining in the digital image, to the pixel count thickness of the backing plate in the digital image, as determined by placement of the markers on the digital image.
  "ABP" is the measured average backing plate thickness, where:
    For inspection of a front brake pad, ABP=6.1 mm
    For inspection of a rear brake pad, ABP=5.7 mm
  "cF" is a correction factor based on external data
  Automotive databases, such as those offered by Motor Information Systems (motor.com), could be used to provide the correction factor (cF) for the average backing plate thickness (ABP) that is used by the image analysis system to generate the calculated remaining brake lining thickness (CBLT). For example, variables such as the official vehicle weight and official rotor thickness stored in such automotive databases could be used to identify which quadrant of the FIG. 28 a particular vehicle fell into. For example, a vehicle with a weight below a certain threshold, and rotor thickness below average, would likely trend to the lower side of the thickness ranges in FIG. 28. FIG. 28 shows that the front brake pads have a single thickness mode distribution of. It also shows that the rear brake pads have a bimodal thickness distribution, with a first distinct mode around 6.0 mm and a second mode around 5.0 mm, at which modes/values the graph shows there were larger numbers of vehicles with rear brake backing plate thickness at or near these values than at other thickness values. Given this correlation, the automotive database would therefore provide a correction factor (cF) for that vehicle that would be used to modify, for example, the average backing plate thickness so that it fell closer to the second mode, around 5.0 mm, as opposed to ~6.0 mm for vehicles that fell substantially higher in vehicle weight and rotor thickness.

While the above embodiments disclose using the backing plate thickness measured in the digital image as a factor in determining whether the brake lining thickness is too thin to continue operating the brake pads, in an alternate embodiment (not depicted), various markers can be used in the analysis GUI 170 to mark the leading and trailing edges of the brake rotor 12, instead of those of the backing plate 22 of the brake pad 16, without departing from the scope of the present disclosure. In such an embodiment then, a measurement "C" would be the pixel count thickness of the rotor shown in the digital image, and the ratio C/B or B/C is a ratio of the pixel count thickness of the brake rotor 12 to the pixel count thickness of the brake lining 20 (or vice versa). In such an embodiment, this calculated ratio is then compared to a threshold ratio value to determine whether the relative thickness of the remaining brake lining 20 has become too thin as compared to the relative thickness of the a brake rotor 12, such that the brake pads 16 have become unsafe for continued use and must be replaced, or conversely whether there is still sufficient remaining thickness to the brake lining 20 such that the brake pads 16 are still safe to operate in their current condition for a given rotor thickness. Thus, the threshold value represents the limit value between a thickness of brake lining 20 that is safe to operate for a given rotor 12 thickness, and a thickness of brake lining 20 that is unsafe to operate for a given rotor thickness 12. Similarly to the above alternate embodiments, the ratio B/C could be multiplied by one or more of an average brake rotor thickness, or an actual brake rotor thickness to arrive at a calculated brake lining thickness in millimeters that can then be compared to a threshold value delineating the minimum safe thickness value of a brake lining in millimeters (or other unit of measure) to determine whether the pad lining thickness is too thin requiring the brake pad to be replaced, or still think enough to be safe for continued operation.

Figure 23:
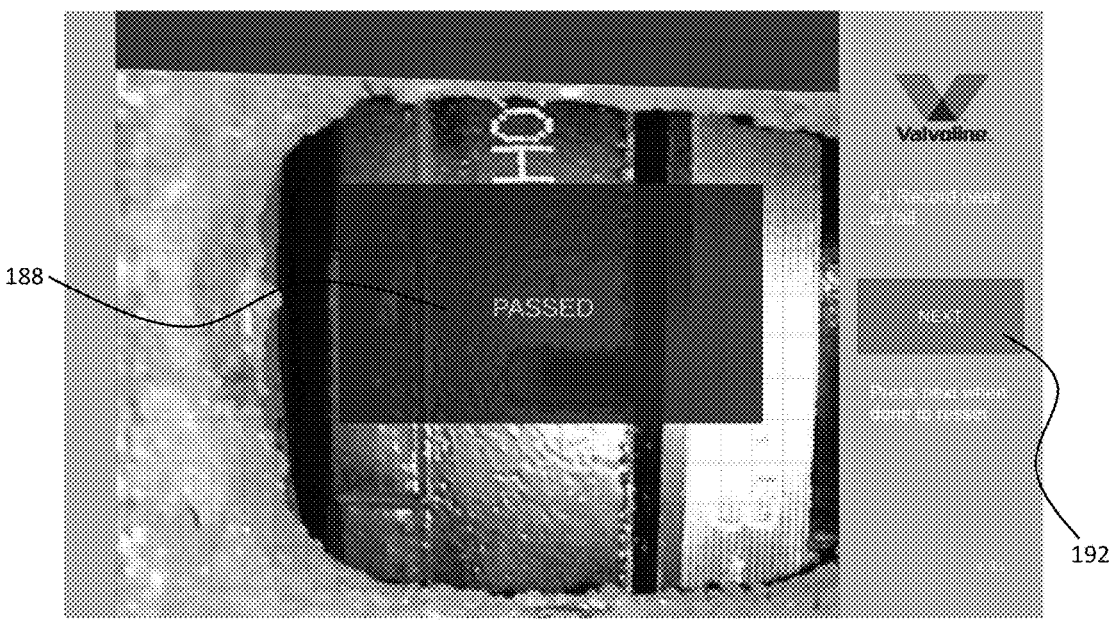
FIG. 23 is a screenshot of an embodiment of the analysis GUI displaying the captured image, as shown in FIG. 21, after a measurement and analysis of the thickness and associated safety of the brake pad lining, and overlaying a visual message indicative of the condition of the brake lining and any service recommendations for the brake pads.

Referring to FIGS. 19-22, in one embodiment, after the user selects the selectable first digital button 182 labeled "Show Markers" (FIG. 19) or the like on the analysis GUI 170, as discussed above, and the markers 154, 156, 158 appear on screen in the analysis GUI 170 for placement by the user, the first digital button changes to a new second digital button 186 that reads "Measure," (FIGS. 20-22) or some similar text or phrase indicating the function of the button has also now changed to that for initiating the measurement and recording of a calculation of A, B, and a ratio A/B or B/A. Referring to FIGS. 21-22, once the markers have been placed at the desired edge locations on the image 94 of the backing plate 22 and brake lining 20, the user may select via onscreen touch of a finger or stylus, or selection with a computer mouse, the second digital button 186 now displaying the label "Measure". Selecting the "Measure" button 186 initiates the image analysis system 138 to confirm and record the calculated ratio A/B or B/A. Referring to FIG. 23, immediately after selection of the "Measure" button, a result message 188 is overlaid onscreen indicating the results of the inspection measurement, corresponding to the measured condition of the brake lining 20 based on the calculated ratio and a comparison to one or more threshold values stored in the image analysis system 138.

Referring to FIG. 23, in one embodiment, in which there is a single threshold ratio value stored in the image analysis system to which the calculated ratio A/B or B/A is being compared, the message 188 may be one of either a basic "Passed" or "Failed" message. In essence, this is a basic single condition pass/fail measurement and message. A message of "Passed" indicates the calculated ratio A/B or B/A falls within the first range of ratio values, within which there is still sufficient remaining thickness of the brake lining 20 in comparison to the thickness of the backing plate 22, to continue operating the car and brake system safely without requiring any maintenance on, or replacement of, the brake pads 16. A message of "Failed" indicates that the calculated ratio A/B or B/A falls within the second range of ratio values, within which there is not enough remaining thickness of the brake lining 20 (i.e. the brake lining is too thin and worn down) in comparison to the thickness of the backing plate 22 to continue operating the car and brake system safely. With receipt of a "Failed" message, the image analysis system 138 recommends replacement of the brake pads 16 or provision of additional service recommendations as necessary. The single threshold ratio value represents a limit value between the first range and the second range, above or below which the two different brake pad conditions are defined.

In still alternate embodiments, the image analysis system 138 may have stored therein one or more threshold ratio values that define the limits between multiple ratio ranges corresponding to various brake pad conditions beyond a simple "Passed" or "Failed" condition, for comparison with the calculated ratio of A/B or B/A for a captured image. For example, in one embodiment, there may be a first range of defined ratio values bounded by at least a first stored ratio threshold that corresponds to a "Passed" brake pad condition, in which a calculated ratio A/B or B/A falling within this range indicates the measured brake pad has a remaining brake lining thickness that is acceptable and safe for continued operation of the brake system and vehicle, in comparison to the thickness of the backing plate. For such a brake lining falling in this first range, upon selecting the digital button 186 when it is labeled "Measure", a "Passed" or "Good" result message 188 or the like is displayed on the Analysis GUI 170. In such embodiment, there may also be a second defined range of ratio values above the first range of ratio values, bounded at opposing ends of the range by the first stored ratio threshold and a second stored ratio threshold, that corresponds to a "Warning" or "Consider Replacing" brake pad condition. For the "Warning" or "Consider Replacing" condition, a calculated ratio A/B or B/A falling within this second range indicates that, while the remaining brake lining thickness is still generally considered safe for continued operation of the vehicle and brake system, the brake pads are showing considerable wear in comparison to the thickness of the backing plate and should be replaced soon. For such a brake lining 20 falling in this second range, upon selecting the digital button 186 when it is labeled "Measure", a "Warning" or "Consider Replacing" result message 188 or the like is displayed on the analysis GUI 170 on the display screen 54. In such embodiment, there may also be a third defined range of ratio values above the second range of ratio values, bounded at one end of the range by the second stored ratio threshold, that corresponds to a "Failed" or "Replace Immediately" brake pad condition, in which a calculated ratio A/B or B/A falling within this range indicates the remaining brake lining thickness is too thin and worn down in comparison to the thickness of the backing plate, such that continued operation of the vehicle and brake system would be unsafe. For such a brake lining falling in this third range, upon selecting the digital button 186 when it is labeled "Measure", a "Failed" or "Replace Immediately" result message 188 or the like should be displayed on the analysis GUI 170 on the display screen 54. In further alternate embodiments, in addition to the "Passed", "Failed", and/or "Warning" messages generated by the system, the image analysis system 138 may be further configured to provide the communication of additional service recommendations as may be needed based on calculated ratios A/B or B/A and the ranges above or below various threshold ratio values such calculated ratios may fall. It should be understood that the defined ratio ranges when the calculated ratio A/B is used, may be different than the defined ratio ranges when the calculated ratio B/A is used, and the "Passed" and "Failed" messages may also change accordingly with the changes to the defined ratio ranges.

In further embodiments, referring to FIGS. 14 and 22, many brake pads have a center U-shaped slot 190 extending across a middle portion of the brake lining 22 from one long side of the pad to the opposing long side of the pad, which serves to relieve stress and minimize vibration in the brake lining, and allow gasses to escape. This center slot 190 is also visible through the inspection hole 18 in the brake caliper 14. When the calculated ratio between the brake lining thickness and backing plate thickness is determined by the image analysis system 138 to be within the "Passed" range, this slot is almost always visible. When the calculated ratio is determined to be within the "Warning" range closer toward the "Passed" range (in embodiments that have three different result message possibilities), the slot will usually be visible. When the calculated ratio is within the "Failed" range, the brake lining has worn away to such an extent that the slot 190 is no longer visible. Thus, the visibility of the slot 190 in the captured image 94 loaded in the analysis GUI 170 can serve as a visual validation, whether the slot 190 is visible or not, of the calculated results generated by the image analysis system 138.

Figure 24:
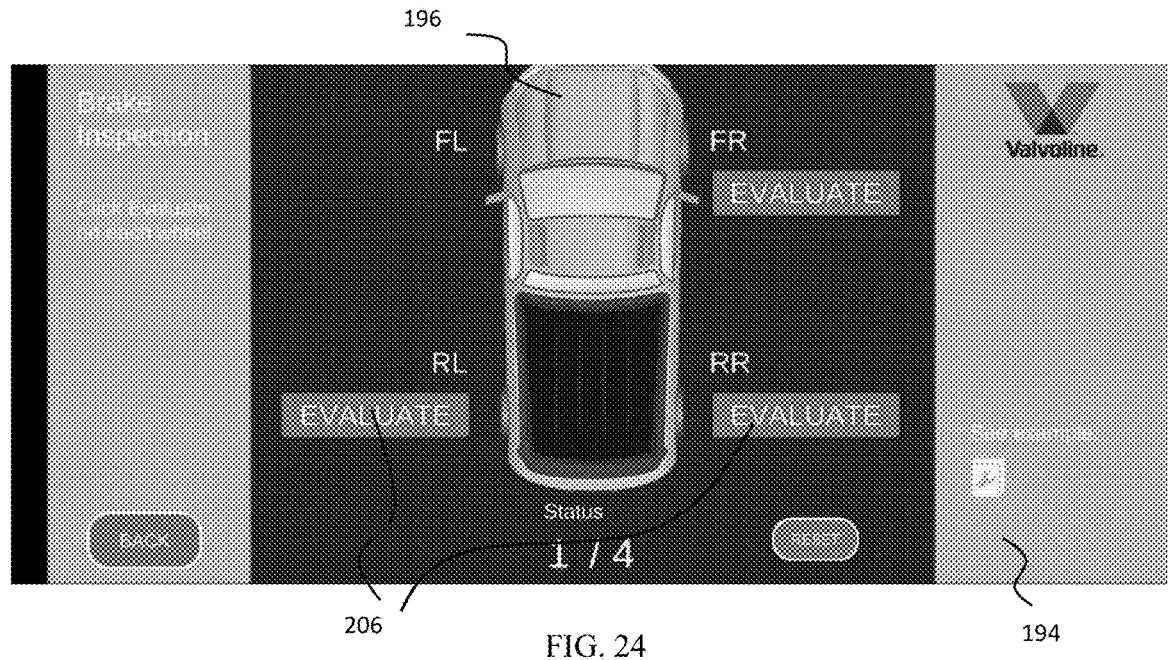
FIG. 24 is a screenshot of an embodiment of a page of the analysis GUI displaying a schematic representation of the vehicle being inspected, with separate selectable digital buttons that are each individually selectable to initiate inspection of each one of the four brakes of the vehicle.
Figure 25:
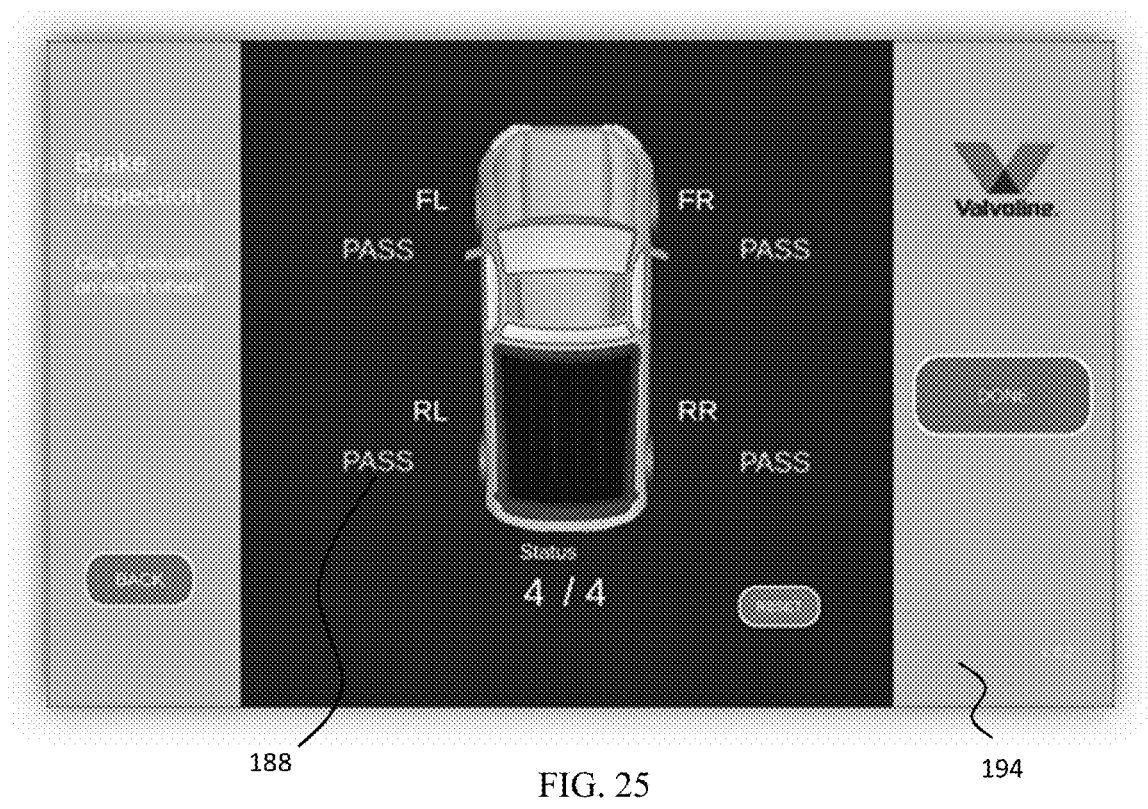
FIG. 25 is a screenshot of the page of the analysis GUI from FIG. 24 after all brakes have been inspected and displaying a text based visual indication of the results of the inspection of each of the four brakes of the vehicle.

Referring to FIGS. 23-25, in one embodiment, after the results message 188 from the measurement and analysis of a given brake pad 16 are displayed onscreen, as shown in FIG. 23, selection of third onscreen digital button labeled "Next" 192, or other similar label, exits the results screen of FIG. 23 for the brake pad 16 that was just measured and returns the user to a vehicle overview screen 194 (FIG. 23). Referring to FIG. 24, the vehicle overview screen 194 shows a top view of an image of a vehicle 196 representative of the vehicle whose brakes are being inspected. In some embodiments, this vehicle overview screen may be a main starting screen for the image analysis system 138. In such screen 194, the technician may select a graphical representation corresponding to which specific brake pad 16 (i.e. Front Left "FL", Front Right "FR", Rear Left "RL", or Rear Right "RR", etc.) on the vehicle that the technician intends to next inspect. The technician then may either take a new digital image of the vehicle's brake pad 16 as described above, or if the technician initially captured digital images of multiple of the vehicle's brake pads 16 when the vehicle was first brought in for service, then the technician may select a previously taken digital image of the brake pad to be inspected, as discussed above (See FIG. 17). Referring to FIG. 25, the results of the inspection analysis for each such brake pad 16 that has been inspected and analyzed will be recorded, and the pass/fail results 188, or other indicated results as the case may be, may be shown in the vehicle overview screen 194.

In further embodiments, the image analysis system 138 may include a database 106 within the non-transitory storage medium 104. Alternatively, such a database 106 may be a remote database stored in a remote server connected to the image analysis system 138 via the communications network 70 (not shown in FIG. 12). The database 106 may list various brake pad manufacturers and each of the different brake pad models manufactured thereby, together with the different threshold ratio values and/or condition ranges between the backing plate thickness and the brake lining thickness at which each manufacturer advises various of the "Passed", "Failed", and/or "Warning" messages should be displayed. In this embodiment, the user can first select from the database the specific brake pads installed on the vehicle, so that the appropriate threshold ratio values for the specific brake pads installed on the vehicle can be recalled from the database, loaded in to the inspection system 30, and utilized by the image analysis system 138 in making the pass/fail/ warning determinations based on the calculated ratios A/B or B/A. Furthermore, in additional embodiments, the database may include, for each such brake pad listed therein, data and/or information regarding one or more physical and/or material parameters of each, such as the specific friction material from which the brake lining is made and/or the real world average thickness dimensions of each of the backing plate 22, the brake lining 20, and the overall combined thickness of the brake pads 16 when they are in "new" condition. In embodiments in which the known backing plate 22 thickness data is included in the database, for each such brake pad 16 in the database, because the backing plate 22 thickness for a brake pad 16 remains constant through the life of the brake pad 16, the image analysis system 138 can utilize the backing plate thickness recalled from the database together with the calculated ratio A/B or B/A from the captured image 94 of the brake pad 16 on the vehicle, in order to fairly accurately calculate the actual thickness of the remaining brake lining 20 and/or overall thickness of the brake pad 16 on the vehicle, as was discussed in greater detail above. Such calculated actual thickness value can then also be reported/displayed in the analysis GUI 170, and/or recorded to the customer's electronic vehicle maintenance records for that specific maintenance visit.

In one embodiment, the selection from the database of the specific brake pads installed on a given vehicle may be made via a brake pad selection interface in the analysis GUI 170 (not shown in the drawing figures). The brake pad selection interface may be one or more of a dropdown menu shown in the analysis GUI 170, in which dropdown menus are listed the names of the various manufacturers of brake pads, and the associated brake pad models each manufacturer produces. In such an embodiment, there may be a first dropdown menu listing manufacturers of brake pads, and a second dropdown menu listing specific brake pad models manufactured by each manufacturer listed in the first dropdown menu. A selection of a specific manufacturer in the first dropdown menu, may filter and limit the available choices that are shown in the second dropdown menu, to only listing those brake pad models produced by the manufacturer selected in the first dropdown menu. In an alternative embodiment, there may only be a single dropdown menu listing, for every brake pad model contained in the database, a single line for each brake pad naming both the manufacturer and the specific brake pad model. In additional alternate embodiments, there are other similar ways of selecting from the database the manufacturer and model of the specific brake pad 16 installed on the vehicle, without departing from the scope of the present disclosure.

In another embodiment, the database may additionally include a default threshold ratio value that can be recalled from the database, and used by the image analysis system, when either the manufacturer or model of brake pad 16 installed on a vehicle is unknown. Additionally, such default threshold ratio value can also be used when the manufacturer and model of the brake pad 16 installed on the vehicle is known, but for which such known brake pad model there is no corresponding known threshold value listed in the database.

In still additional embodiments, the vehicle's VIN number may be used to look up from a vehicle manufacturer's database the specific manufacturer and model of the brake pads 16 that were originally installed on the vehicle, together with one or more physical properties of the brake pads 16, such as original thickness information for one or more of the brake lining 20, the backing plate 22, and/or the overall brake pad thickness.

While the above embodiments disclose the comparison of the calculated ratio B/A or A/B to various threshold ratio values stored in the non-transitory computer readable storage medium 104, or the database 106 of brake pads and their associated manufacturers, in alternate embodiments a slight variation on the comparison may be utilized. In such alternate embodiments, there may alternatively or additionally be stored in the non-transitory computer readable storage medium 104 or database 106 of brake pads 16 and manufacturers, specific defined ratio ranges that each correspond to one or more of the aforementioned brake lining and/or brake pad conditions, without departing from the scope of the present disclosure. In such embodiments, whichever of the specific defined ratio ranges the calculated ratio B/A or A/B falls into, the corresponding condition and or service message for that range is displayed to the user in the analysis GUI 170 and may be recorded in the electronic service records for the vehicle on which the brake pads 16 are installed.

While the above embodiments generally disclosed the image analysis system 138 utilizing vertical markers 154, 156, 158 to mark vertically oriented edges of the backing plate 22 and brake lining 20, in alternate embodiments, the captured image may be rotated such that the edges of the backing plate and brake lining are oriented in a horizontal direction, a thickness direction of the brake lining is oriented in the vertical direction, and the markers to be moved are horizontally aligned and will be moved vertically to the appropriate edge locations, without departing from the scope of the present disclosure. In such embodiments, the pixel calculations of the distance between markers that define the measurements A and B would simply be a vertically aligned pixel count of the number of adjacent vertically aligned pixels between markers 1 and 2, and between markers 2 and 3, without departing from the scope of the present disclosure.

In additional embodiments, one or more of the image capture device 112 and/or image analysis system 138 may include various user assistance features.

Figure 29:
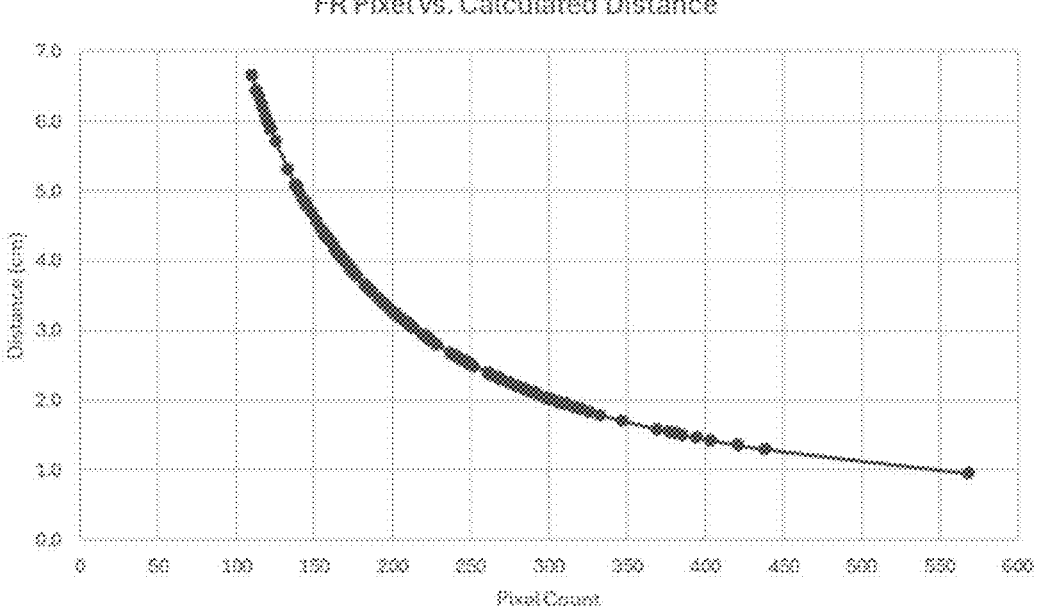
FIG. 29 is graph depicting an exemplary correlation between a distance between the imaging sensor at the time a digital image of the backing plate was captured, and a pixel count distance between trailing and leading edges of the backing plate in the captured digital image.

For example, in one embodiment, the image analysis system may include an accuracy control associated with the accuracy of the calculated ratio A/B or B/A and the overall inspection results. After moving the markers 154, 156, 158 on screen in the analysis GUI 170 to mark the respective edges of the backing plate 22 and brake lining 20, a pixel count validation could be used to judge accuracy and confidence of the calculated ratio and thus the overall inspection results. Given the small clearances or distance between the inner surface of a barrel of a vehicle wheel and the brake caliper or brake rotor when the wheel is still installed on the vehicle, the distance between the imaging sensor and the brake pad is largely constrained by design of the caliper, and the wheel-to-caliper clearance distance. And the further away from the brake pad the imaging sensor is placed, the smaller the brake pad appears in the digital image 94, and the fewer the number of pixels between properly placed markers 154, 156 that mark the edges of the backing plate 22 in the digital image. Given this fact, and the fixed thickness of brake pad backing plates 22, pixel count distances between the two markers 154, 156 aligned with each of the trailing and leading edges of the backing plate 22 must therefore fall within a defined permitted range. Accordingly, in one embodiment the image analysis system can alert the user of an error with the digital image or the placement of the markers when a pixel distance between the two markers 154, 156 for the edges of the backing plate 22 is outside of the permitted range. The user then may be prompted to check placement of the markers or retake the digital image. Furthermore, FIG. 29 depicts a graph showing the correlation between a distance in centimeters between the imaging sensor and the backing plate at the time a digital image of the backing plate was taken, and the pixel count distance between the properly marked edges of the backing plate in the captured digital image 94. This graph can be represented in the image analysis by a programmed function that defines the graph. Accordingly, in such embodiment, with this graph, the pixel count distance between the properly placed markers on the edges of the backing plate in a given digital image can be used to derive the distance between the imaging sensor and the brake pad shown in the digital image, at the time the digital image was taken. Accordingly, in this embodiment, the image analysis system can display a message directing the user to retake the photo, if the image analysis system determines that a derived distance between the imaging sensor and the backing plate 22 in the digital image 94 is larger than the real world distance available between the surface of the barrel of a given vehicle wheel and a caliper of the vehicle wheel (i.e. the derived distance would be impossible under real world conditions with the wheel still installed on the vehicle). Accordingly, the image analysis system can ensure the distance between the imaging sensor and the brake lining or brake pad stays within a predefined range. Moreover, based on a derived distance between the backing plate (or brake pad assembly) a confidence rating for the accuracy of the inspection measurements of the remaining brake lining thickness can be generated and applied, using probabilities derived from "training data" (i.e. ongoing analysis of "incorrect" readings shows a higher probability of errors at short distances between the imaging sensor and the brake pad).

In another embodiment, additional accuracy controls may be implemented to limit the distance the markers 154, 156, 158 may be moved on screen of the Analysis GUI 170. Given the backing plate 22 has a substantially fixed or known thickness and the brake lining has a maximum thickness when the brake pads are new, a maximum permissible ratio of the measured pixel count brake lining thickness "B" to the measured pixel count backing plate thickness "A" may be established. This in turn limits the amount of movement of the markers 154, 156, and 158 relative to each other, such that the continuously calculate ratio of B to A (i.e. Ratio=B/A) cannot exceed the maximum established ratio. In other words, once the first 154 and second 156 markers that establish the value of A are set, the third marker 158 becomes limited in maximum distance away it can be placed from the second marker 156, such that the calculated ratio of B/A does not exceed the maximum permissible ratio. Implementing this feature serves to minimize errors on placement of the markers 154, 156, 158 on the digital image 94.

In still further embodiments, the image analysis system may include functionality to automatically detect when a digital image 94 is too blurry to accurately identify the required edges of each of the backing plate 22 and brake lining 20, which would introduce variability and/or errors in the placement of the markers 154, 156, 158 on the digital image 94. In practice, after a digital image is captured, the image analysis system 138 would run a blur detection algorithm to determine if blurriness is present in the image before loading the image into the analysis GUI 170. If blurriness is detected by the image analysis system 138, the user would be prompted by the image analysis system to re-take the photo. If no such blurriness is detected in the digital image 94, the image is loaded in the Analysis GUI 170 as per normal.

In another example, in an alternate embodiment, the image capture device 112 or image analysis system 138 may include AI, or machine vision, capable of automatically identifying one or more components of the brake pad and/or brake system, such as for example, the backing plate 22, the brake lining 20, the rotor 12, and any interfaces, edges 160, 162, 164, 166, or lines of interface between any of the aforementioned components. In such embodiments, when the captured image 94 is sent to the image analysis system 138, the captured image 94 also includes the data from the machine vision that identified such components, and edges/ interfaces thereof. The captured image 94 can then be loaded into the analysis GUI 170 and the markers 154, 156, 158 can be automatically placed at the locations on the image identified by the machine vision corresponding to one or more, or all, of the edges 160, 162, 164, 166 and/or interfaces. A user then needs only to verify and/or validate the interpretation of the previously identified components and the associated edges/interfaces thereof, and need only move a marker 154, 156, 158 in the event that any of the machine vision interpretations as to what a given component is, or the location of any edges/interfaces thereof, were incorrect in a given captured image 94. Such machine vision may also be configured to report a rotor condition from or in the captured images 94, by identifying or highlighting any grooves that have been worn into the braking surfaces of the rotors, and/or displaying a results message 188 in the analysis GUI 170 corresponding to an identified condition.

In another embodiment, the image capture device 112 may include its own overlay tool disposed at an integrated in a distal end of the probe 36 adjacent to the imaging sensor 38 that can project one or more of a laser, spotlight, grid pattern, and/or line pattern onto a surface of the brake lining, backing plate, rotor, or other such brake components, as an alignment tool in order to help guide a user on where to locate the image capture device just prior to image capture. For example, the image capture device 112 may include a laser that projects a dot or line as an alignment tool, and aligning the dot or line on the edge of the brake lining, or on the edge of the rotor, as may be seen on the display screen 54 for the image capture device 112 would make it easier to capture an image 94 of the brake lining 20 that is clearer and better aligned than such an image would be without such alignment tool.

Figure 26:
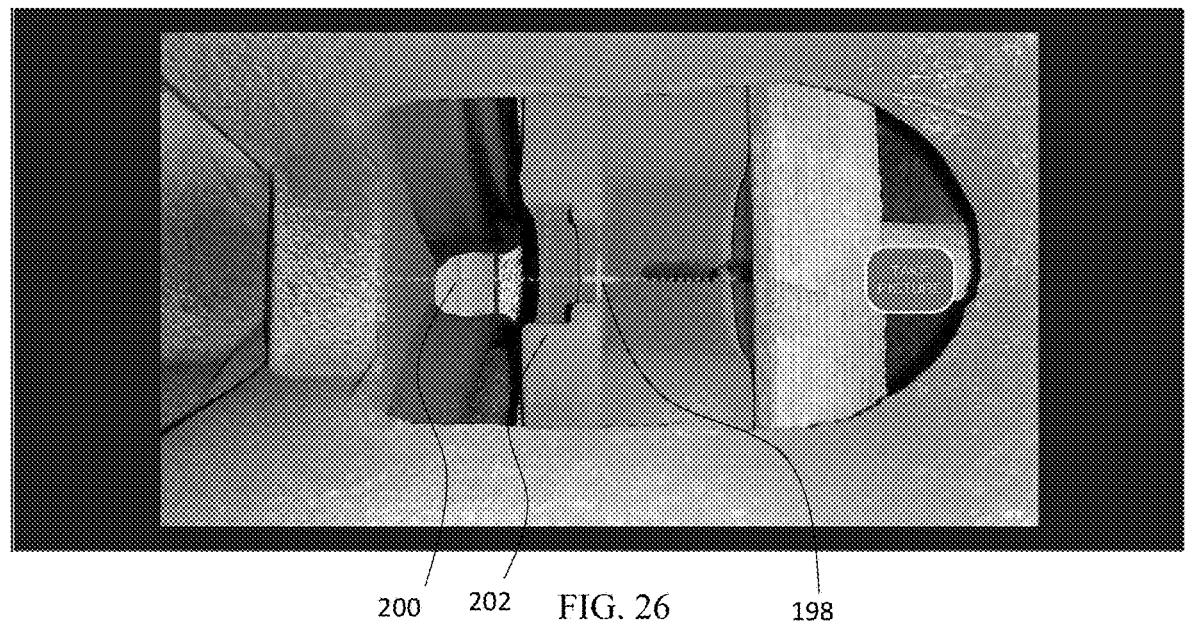
FIG. 26 is a screen shot of a live view from the display screen showing what the imaging sensor sees within its field of view, and including onscreen digital guides overlaid in the field of view to provide target points for alignment of the imaging sensor in relation to the brake lining or backing plate.

In additional alternate embodiments, the display screen 54 for the image capture device 112, which shows a live image of what is within the field of view 40 of the imaging sensor 38 when placing the imaging sensor adjacent the brake pad 16 prior to image capture, may include onscreen digital guides to assist proper placement and/or alignment of the imaging sensor 38 in relation to the brake pad 16. Referring to FIG. 26, such onscreen digital guides may include a brightly colored digital cross hair 198 or various alignment lines 200 (shown as dashed lines in FIG. 26), such as green or other bright color that is easily visible over the live brake pad image shown onscreen, and which can provide target points for alignment of the imaging sensor 38 with respect to one or more of the brake lining 20 and/or backing plate 22 shown on the display screen 54.

In additional embodiments, to assist in placing the imaging sensor 38 a consistent distance away from the brake pads 16 from one vehicle to the next, the onscreen guides may also include a fixed guide box 202 having a fixed width. The user adjusts the physical distance between the imaging sensor 38 and the brake pad 16 until the live image of the backing plate 22 shown in the display screen fills the guide box 202 displayed on the display screen 54, at which point the user will know that the imaging sensor 38 is located the correct distance away from the brake pad 16 for capturing a digital image 94 thereof. This minimizes variation in the size of the brake lining 20 and backing plate 22 shown in the captured digital image 94 from one image to the next. And filling the guide box 202 may also enable the locking of a position of the first and second markers 154, 156 relative to each other, such that when the captured image 94 is shown in the analysis GUI 170 and the markers 154, 156, 158 are displayed thereon, the distance between the first and second markers 154, 156 is locked and they need only be simultaneously placed together on the image 94 aligned with the leading and trailing edges of the backing plate 22, while the third marker 158 is separately placed on its own at the leading edge 164 of the brake lining 20.

In further embodiments, the image analysis system 138 may permit the application of one or more digital image filters to the captured image 94 loaded into the analysis GUI 170 to make it easier to see and/or highlight various intersection points, features, and/or interfaces among key components shown in the digital image 94, such as the interface between the trailing edge of the brake lining and the leading edge of the backing plate, or between such edges and a digital overlaid intersection line that is present to help identify edge locations, as discuss below. Such filters can change any one or more of the exposure, contrast, brightness, saturation, tint, sharpness, white balance, gain, and other similar image parameters of the captured digital image 94. The system can automatically choose a preprogrammed filter with combinations of varied image parameters, such as a "negative" filter that makes the digital image look like a film negative of the image 94, based on the image 94 lighting quality, or the user can adjust the filter parameters manually one at a time or in various combinations as needed to make it easier to see the various edges and features. In still alternate embodiments, the image analysis system 138 may either duplicate the digital image 94, or capture two immediate successive images with either a second imaging sensor or immediately sequentially using a single imaging sensor. Having dual images would permit the application of the filters and/or other modifications to one copy of the digital image 94, while the second copy is maintained as captured for reference. The purpose of two such images is it permits one image to be filtered to assist the user in determining where to place the markers 154, 156, 158, while still being able to reference an unfiltered copy of the image as well.

In further embodiments, as shown in FIG. 22, the image analysis system may apply a brightly colored, for example green, horizontal line 204 to the analysis GUI 170 upon the loading of the captured image 94 therein. Due to the contrast between the typically dark and dirty features of the brake pad 16 in the captured image 94 and the bright line 204 on top of the digital image 94, the bright line 204 may serve to highlight, bring out, identify, or make clearer the intersection point between such bright line 204 and various vertical edges 160, 162, 164, 166 of the brake lining 20 and/or backing plate 22, or other such vertical edges and features of interest in the digital image 94 of the brake pad 16. The highlighting of the intersection points can be used as a guide to more accurately identify for a user where the vertical edges of the brake lining 20 and backing plate are 22, and where to place the markers 154, 156, 158 used for making measurements of the brake lining 20 thickness and the backing plate 22 thickness.

In still other embodiments, the image capture device 112 may include a reticle overlay on the light source 50, or on a lens of the light source 50 disposed at the end of the probe 36. The light source 50 containing the reticle overlayed thereon may project a pattern and/or feature on one or more of the brake lining 20, backing plate 22, and/or rotor 12. The projected pattern and/or feature serves as a visual aid to permit a user to more accurately place the imaging sensor 38 at a desired location and/or orientation in relation to the brake lining 20 and backing plate 22, prior to capturing an image thereof with the imaging sensor 38. In some embodiments, where the imaging sensor 38 includes technology capable of taking of direct optical measurements, such as for example a LIDAR sensor, including a reticle overlayed on the light source 50 as disclosed above can allow for proper positioning and orientation of the imaging sensor 38 to permit taking direct measurements of the actual thickness of the brake lining and/or backing plate.

In further embodiments, the image capture device 112 or the image analysis system 138 may include the ability to automatically rotate the captured image 94 so that the edges to be marked 160, 162, 164, 166 when the captured image 94 is loaded into the analysis GUI are already aligned in the same direction as the markers 154, 156, 158.

In still further embodiments, the image analysis system 138 can be used to report "remaining useful life" of the brake linings 20 by calculating and recording trends based on multiple subsequent brake inspections/analyses by the inspection system 30. In such an embodiment, upon the first brake inspection/analysis, the captured images 94 of the brake lining 20 are taken and analyzed by the image analysis system 138, and the ratio between brake lining 20 thickness and baking plate 22 thickness is calculated to provide an indication of the brake lining condition at that first inspection/analysis. When the same calculations are made at the next consecutive inspection appointment, "remaining useful life" calculations can be made by comparing the calculated ratio from the first inspection, to the calculated ratio at the next consecutive inspection, then projecting the change in such calculated ratio forward for future inspections to determine an approximate amount of time, or number of driving miles, left before the calculated ratio will likely indicate that the brake linings 20 are at the end of their usable life and the brake pads 16 need to be replaced.

In still further embodiments, the image analysis system 138 may include a built in training recertification feature, wherein the image analysis system 138 may periodically lock out the user from normal use of the image analysis system 138, and instead enter a recertification mode to test or validate the user's knowledge as to where to place the edge identification markers 154, 156, 158 on a test image. Once the image analysis system 138 enters the recertification mode, the analysis GUI 170 will load a known test image of a side view of a brake pad 16, viewed through an inspection hole 18 of a brake caliper 14. To pass the test, the user must correctly place the markers 154, 156, 158 on each of the trailing and leading edges 162, 160 of the backing plate 22, and the leading edge 164 of the brake lining 20. If the markers 154, 156, 158 have each been placed at the correct locations, and in the correct order, the image analysis system will issue a notification that the user passed the test, and return to normal operation, again permitting brake inspection. In this manner, the image analysis system 138 has a built-in, on-the-fly, required recertification functionality.

In still further embodiments, the image analysis system 138 may track the time it takes to inspect and analyze each of the individual brake pads 16 of a given vehicle, and/or the total amount of time it takes to analyze and/or service all of the brake pads 16 of the vehicle, and report such time data back to electronic customer service records for the vehicle stored in a local or remote database. Such feature may also include tracking the amount of time it takes to service and/or replace any one of the brake pads 16 and/or rotors for a customer vehicle if such service is needed. In such an embodiment with time tracking, the digital timer may be initiated any number of ways, including, for example, by manually selecting an on screen start/stop digital button for a digital timer. Alternatively, the timer may also be automatically started in the image analysis system 138 upon the entering in, or retrieving from, the database the customer and/or vehicle information for the vehicle to be serviced. In still another alternative embodiment, as discussed above, the image analysis system 138 may include an initial screen in the analysis GUI 170 depicting a graphical representation of the vehicle 196 to be serviced and having a plurality of onscreen selection buttons 206, one button per wheel of the vehicle, that each separately initiate the inspection, analysis, and recording of inspection results data for the brakes associate with that wheel. The selection of any one of these onscreen buttons 206 will initiate the analysis process for the brakes associated with that wheel as discussed above, and start a timer to track the amount of time it takes to complete the inspection/analysis of the brakes at that wheel. In addition, the selection of the first of such digital buttons 206 for the vehicle starts an overall global timer for the total time it takes to inspect and analyze all of the brakes for the vehicle, and selection of an onscreen completion or end button, or the like, after the last brake pad of the vehicle has been inspected and analyzed, will stop the global timer and show/record a total time it took to inspect, analyze, and/or service all of the brakes for the vehicle.

The aforementioned embodiments of the inspection system 30 disclosed above contemplated an image capture device 112, such as a handheld image capture device, that is configured to capture digital images and send them via a communications network or communications cable to a remote or local image analysis system 138. Accordingly, it is contemplated that, in various alternate embodiments, the image analysis system and all of its structure, components, programming, and functionality may be fully incorporated into the image capture device, as a standalone image capture and analysis device, or alternatively incorporated into a separate device or system, such as a locally connected cell phone or remote computer or server, without departing form the scope of the present disclosure. In a fully integrated or local embodiment, all of the image manipulation, marker placement, marker distance calculations, ratio calculations, comparisons of the calculated ratios to threshold ratio values, determination of the brake lining conditions based on the comparisons, and service messaging and/or recommendations would be performed either in, on, or by the image capture device itself, as a single standalone handheld full inspection system or device, or alternatively by a locally connected handled device (e.g. cell phone or tablet) in local communication with the image capture device. In any such embodiments, the inspection system may be connected to a remote server, database, or computer system via a communications network, to be able to report or record the results of the inspection into the electronic maintenance records of the vehicle owner.

In operation, the system of the present disclosure functions according to one or more of the following embodiments of a method for inspecting brake pads without removing the wheels of a vehicle.

Referring to FIGS. 13, 15, and 27, in general, an embodiment of a method of the present disclosure, is carried out by first placing 300 a probe 36 of an image capture device 112 adjacent an inner surface of a barrel 150 of a wheel 146 of a vehicle, while the wheel remains installed on the vehicle. A distal end of the probe 36 includes an imaging sensor 38 disposed thereon that is placed generally within the substantially cylindrical space defined by the inner cylindrical surface of the barrel of the vehicle wheel, in which cylindrical space each of the vehicle brake rotor 12, brake caliper 14, and brake pad 16 are located when the wheel is installed on the vehicle. The imaging sensor 38 is placed within the wheel of the vehicle such that the side views of each of the backing plate 22 and the brake lining 20, showing the respective thicknesses thereof, are positioned within a field of view 40 of the imaging sensor 38.

Referring to FIG. 13, in some embodiments, the distal end of the probe 36 may be positioned within the barrel 150 of the vehicle wheel 146 directly against the inner surface of the barrel 150, so that the inner surface of the barrel is used to support and steady the distal end of the probe 36, and the imaging sensor 38 disposed thereon, from unnecessary movements, such as shaking of the longitudinally extending probe 36 and imaging sensor 38. In such an embodiment, the imaging sensor 38 disposed at the end of the probe 36 is located between the inner surface of the barrel of the wheel and an inspection hole formed in a brake caliper 14, through which inspection hole 18 a side view of the brake lining 20 is visible showing a remaining thickness of the brake lining of the brake pad. Accordingly, when properly located or placed against the inner surface of the barrel of the wheel 148, each of the inspection hole 18 in the caliper 14, and the side view of the backing plate 22 and brake lining 20, showing the respective thicknesses thereof, are positioned within a field of view 40 of the imaging sensor 38. Preferably, the center of the field of view of the imaging sensor is directed radially inward toward a rotational axis of the wheel and brake rotor, such that the inspection hole 18 in the caliper 14 and the side view of the brake lining 20 and backing plate 22 that shows the respective thicknesses thereof, also fall within the center of the field of view 40.

Referring to FIG. 15, in an alternate embodiment, the method may be carried out by placing the distal end of the probe 36 of the image capture device 112 against an outer braking surface of the brake rotor 14, which outer braking surface of the brake rotor is the braking surface facing away from the vehicle and located on the same side of the rotor 14 as the wheel studs that affix the wheel 148 to the rotor. In this embodiment, the imaging sensor 38 disposed at the distal end of the probe 36 is arranged and/or oriented such that a field of view of the imaging sensor 38 is generally directed radially inward along, and/or substantially parallel to, the outer braking surface of the rotor, and the side view of the brake lining 20 and backing plate 22 showing the respective thicknesses thereof falls within the field of view 40 of the imaging sensor 38. In this embodiment, the probe can either be placed against either the outer braking surface of the rotor, or on the inner braking surface of the rotor that faces towards the vehicle. In embodiments in which the probe 36 is placed against the outer braking surface of the rotor 152, the user places the probe through the spokes of the wheel 148, and can further use one or more spokes together with the braking surface of the rotor to support and steady the probe so the imaging sensor 38 can capture clear images without the imaging sensor shaking.

Referring to FIG. 27, once the probe 36 and imaging sensor 38 of the image capture device 112 have been properly placed, oriented, or located, the method continues by next capturing 302, via the image capture device, a digital image 94 of a side view of the brake lining and backing plate of the brake pad showing the respective thicknesses thereof. The digital image 94 may be captured with the image capture device 112 by the initiation of a trigger signal sent by a user of the device, via a user input interface. In one embodiment, the user input interface 56 may be disposed in the image capture device. In some embodiments, the user input interface may be one or more of a physical or tactile button 140, 142, 146, and initiating of the trigger signal may occur by a user pressing the physical or tactile button. In alternate embodiments, the user input interface may be one or more of a programmed selectable graphical button or haptic displayed and available for selection on a touch sensitive display screen 136 used with the image capture device 112, and initiation of the trigger signal may occur by a user touching, or touching and pressing, one or more the graphical button or haptic on the display screen 136.

In some embodiments, upon initiating the trigger signal, the processor 58 of the image capture device 112 causes the imaging sensor 38 to capture a digital image 94 of the side view of the brake lining and backing plate within the imaging sensor's field of view. The captured digital image can be sent to a memory in the image capture device. The digital image can then be stored in a non-transitory computer-readable storage medium 104 of the image capture device 112 for recall at a later time. In an alternate embodiment, the digital image can be sent from the memory of the image capture device 112 to the communications module 62 of the image capture device, where it is then automatically sent via a communications network, to a communications module of the image analysis system where it is stored in a non-transitory computer-readable storage medium 104 of the image analysis system 138.

The method continues by loading 304 the digital image into the image analysis system 138. In this step, if the image 94 has been sent to the image analysis system's non-transitory computer-readable storage medium, a processor of the image analysis system may first execute programmable instructions to open an inspection and analysis application in the image analysis system 138, including loading an analysis GUI 170 onscreen to the display screen 54 for the image analysis system 138. In one embodiment, a user may select one or more digital images, from a plurality of prior captured digital images stored in the computer-readable non-transitory storage medium, to be recalled to the analysis GUI 170. In alternate embodiments, initiating the trigger signal may cause the image capture device 112 to capture the digital image 94 with the imaging sensor 38 and automatically send the digital image to the image analysis system 138, and automatically load the digital image 94 into the viewing window 174 of the analysis GUI 170, without a user needing to separately select the specific image to be loaded. In other words, a single image captured by the imaging sensor 38 triggers its automatic loading for viewing and analysis in the image GUI of the image analysis system 138.

The method further continues by identifying and marking 306 one or more of the trailing edge 162 of the backing plate 22, and the leading edge 160 of the backing plate 22, as well as the trailing edge 166 of the brake lining 20 and the leading edge 164 of the brake lining 20, when both are viewed from a side view showing their thickness. In one embodiment, this identifying and marking 306 may be done automatically by machine vision programmed into one or more of the image capture device 112, the imaging sensor 38, or the image analysis system 138. In such embodiments, any one of the imaging sensor 38, the image capture device 112, or the image analysis system 138 may include machine vision programming and executable instructions by which they are able to automatically identify and mark each of the afore-mentioned edges. For embodiments in which either of the imaging sensor 38 and/or image capture device 112 have machine learning capabilities, the identifying of the edges can occur in real time before the digital image is captured, while the imaging sensor 38 is active and displaying on a screen of the image capture device the objects that are within the imaging sensor's field of view 40. In alternative embodi-ments, in which any of the imaging sensor 38, the image capture device 112, or the image analysis system have machine learning capabilities, the identifying and marking 306 of the respective backing plate edges and brake lining edges can be done directly in, or using, the digital image 94 after it has been captured. In either embodiment in which such edge identification and marking 306 is done automati-cally by machine learning, the digital image with its edges identified and marked is displayed on the captured image viewing window 174 of the analysis GUI 170. The captured image viewing window 174 includes a grid 176 of vertical and horizontal lines overlayed on the displayed digital image. When the digital image is displayed in the captured image viewing window, the image analysis system can automatically rotate 48 the digital image displayed in the image viewing window such that the edges are aligned to the vertical or horizontal lines of the grid overlay. This is helpful for any digital images whose edges are not natively oriented in the captured digital image in one of a substantially vertical or horizontal direction.

Referring to FIGS. 19-21 and 26, in still alternate embodi-ments, the identifying and/or marking step 306 can be done manually by a user of the image analysis system after the digital image has been loaded into the image analysis system 138 and displayed in a captured image viewing window 174 of the analysis GUI 170. In such an embodiment, upon loading the digital image 94 into the viewing window, an alignment grid 176 of horizontal and vertical lines is over-layed onto the digital image. The user may then use image manipulation input controls to adjust an orientation or position of the digital image, so as to align, by one or more of rotating, zooming, and/or panning the digital image within the viewing window, the edges of the brake lining and backing plate with one or more of the vertical and horizontal grid lines.

Referring to FIGS. 19-21, after manually orienting the edges of the brake lining and backing plate to align with the horizontal or vertical grid lines, selecting an onscreen digital button causes a series of markers to display onscreen in the captured image viewing window. The orientation of the markers should correspond to the orientation of the edges of the brake lining and backing plate shown in the viewing window. As shown in FIGS. 19-21, the markers 154, 156, 158 are a series of vertically oriented line markers, and the remainder of this disclosure will refer to them in this orientation. However, it should be understood, that the edges of the brake lining and backing plate, as well as the markers to appear in the viewing window could also be oriented horizontally with the same effect and results, as will further be described below, as for those that are aligned vertically, without departing from the scope of the present disclosure.

Continuing with such manual identifying step, once the user has loaded the markers onscreen by selection of the digital button, using a touch or stylus input on a touchscreen or selection using a mouse, or touchpad, or the like, the user marks each of three edges by sliding the vertically aligned markers in a horizontal direction on the screen. The trailing edge of the backing plate is marked by sliding the dashed line of the first marker into alignment therewith. The leading edge of the backing plate (which is also the trailing edge of the brake lining) is marked by sliding the dashed line of the second marker into alignment therewith. The leading edge of the brake lining is marked by sliding the dashed line of the third marker into alignment therewith.

Once the respective trailing and leading edges of each of the backing plate and brake lining have been identified, either automatically or manually, the method continues by the image analysis system 138 measuring 308 a straight line pixel count thickness of each of the backing plate and brake lining. The measurement may be calculated automatically by the image analysis system 138 once the respective edges are identified and marked, or the measurement calculation may be initiated manually by a user selecting a digital button on a screen of the image analysis system. The measurement is calculated based on the location of the manually placed/located markers 154, 156, 158. In one embodiment, the image analysis system 138 knows the pixel location, within the captured image display window, at which each of the three markers 154, 156, 158 is located. In the embodiment shown in FIG. 21, the image analysis system 138 knows the horizontal pixel location, within the captured image display window of the analysis GUI, of each of the first, second, and third markers 154, 156, 158. In such embodiment, the horizontal straight line pixel distance of the number of adjacently aligned pixels in the horizontal direction between the first marker 154 and second marker 156 corresponds to a measurement "A," which is a representational thickness of the backing plate in pixel units of measure. The straight line pixel distance of the number of adjacently aligned pixels in the horizontal direction between the second marker 156 and third marker 158 corresponds to a measurement "B", which is a representational thickness of the remaining brake lining in pixel unis of measure. Accordingly, the measurements A and B may be determined by the image analysis system.

The method further continues by calculating 310, in the image analysis system 138, a ratio between the measure-ments A and B (e.g. either A/B, or B/A), which corresponds to a ratio between the measured pixel count thicknesses of the backing plate and brake lining respectively. In the embodiment shown in FIG. 20, the ratio calculated is B/A.

With continued reference to FIGS. 20 and 26, the method further continues by comparing 312 the calculated ratio B/A to a threshold ratio value stored in one or more of the memory or the non-transitory computer readable storage medium of the image analysis system, and determining 314 whether the calculated ratio value B/A (or A/B in alternate embodiments) falls within a first defined range of ratio values indicative that the brake lining has sufficient remain-ing thickness such that it still has remaining useful life, or within a second defined range of ratio values indicative that the brake lining has become worn too thin and is beyond its useful life and that the brake pad needs to be replaced. In such an embodiment, the threshold ratio value defines the limit between the first and second ranges of ratio values.

In alternate embodiments, there may be multiple threshold ratio values stored in one or more of the memory or the non-transitory computer readable storage medium of the image analysis system, for comparison with the calculated ratio B/A (or A/B in alternate embodiments), without departing form the scope of the present disclosure. These threshold ratio values define the limits between multiple individual ratio ranges corresponding to various brake pad conditions. In such embodiment, a calculated ratio B/A (or A/B in alternate embodiments) that falls within a first range of ratio values indicates the measured brake pad has a remaining brake lining thickness that is acceptable and safe for continued operation of the brake system and vehicle, in comparison to the thickness of the backing plate. A calculated ratio B/A (or A/B in alternate embodiments) that falls within a second range of ratio values indicates that, while the remaining brake lining thickness in relation to the backing plate thickness is still generally considered safe for continued operation of the vehicle and brake system, the brake linings are showing considerable wear in comparison to the thickness of the backing plate and should be replaced soon. A calculated ratio B/A (or A/B in alternate embodiments) that falls within a third range of ratio values indicates the measured brake pad has a remaining brake lining thickness that is acceptable and safe for continued operation of the brake system and vehicle, in comparison to the thickness of the backing plate. In such embodiment a first threshold value may define the limit between the first defined ratio range and the second defined ratio range, and a second threshold value may define the limit between the second defined ratio range and the third defined ratio range.

Referring still to FIGS. 22 and 26, the method continues by generating 316, in the image analysis system 138, based on the comparison and determination, a service message in the image analysis system, indicative of one or more of the results of the comparison and determination, the associated service condition of the brake pads, and any service recommendations. For example, the messages generated may include one of a "Passed" message being displayed onscreen in the Analysis GUI to a user or technician to indicate that the brake linings still have remaining useful life on them and are safe to continue operating without any maintenance service, or a "Failed" message being displayed to indicate that the brake linings are too thin, beyond their useful life, and the brake pads need to be replaced. Additionally, a "Warning" message or the like may also be displayed to indicate that while the remaining brake lining thickness is still generally considered safe for continued operation of the vehicle and brake system, the brake pads are showing considerable wear in comparison to the thickness of the backing plate and will need to be replaced soon. It will be appreciated that still additional service recommendation messaging may be displayed to a user or technician onscreen in the analysis GUI, without departing from the scope of the present disclosure.

In still further alternate embodiments, the method may continue by recording the results of one or more of the resulting calculation, determination, and or messaging in the electronic maintenance records for the vehicle on which the inspected brake pads are installed.

In one embodiment, under certain conditions, it may be possible to reduce brake inspection time in half. In-service brake pad inspection and measurement typically involves capturing images of the brake linings 20 and backing plates 22 for all four wheels (of a four wheeled vehicle). However, brake service data has shown that, for a given pair of driver's side and passengers side brake pads, at either of the front end or the rear end of the vehicle, if the remaining brake lining as calculated for either of the driver's side or passenger's side brake pad is above a threshold thickness value, for example 4 mm thick (with a standard deviation of around 1 mm), the brake linings wear substantially evenly between the driver's side and the passenger side of the vehicle, such that it is unnecessary to inspect the opposing driver's or passenger side brake pad at the same end of the vehicle. In other words, if the front driver's side brake lining is above this threshold value (e.g. 4 mm) and passes inspection, the front passenger's side brake lining can be considered to also have that same/similar wear and remaining thickness, without actually needing to inspect the front passenger's side, and vice versa. Accordingly, the image analysis system may further include program logic configured to determine, based on this correlation and inspection of a first brake pad at one of a front end or rear end of the vehicle, whether a technician needs to inspect the opposing driver's/passenger's side brake pad at the same front/rear end of the vehicle. If the image analysis system determines that there is a remaining brake lining thickness of at least the threshold thickness value (e.g. of 4 mm or more) for a first brake pad, and the brake pad otherwise passes inspection, the program logic can determine that the opposing brake pad at the same end of the vehicle also passes inspection and does not need to be inspected, thereby cutting the inspection time for the brake pads at that end of the vehicle in half. The threshold thickness value above which the brake linings wear substantially evenly between a driver's side and a passenger's side of the vehicle at one of the front or rear end of a vehicle, may be a different value depending on the specific vehicle in question, the category/type of vehicles, weight of the vehicle, etc. In alternate embodiments, the threshold value may be larger or smaller than 4 mm, without departing from the scope of the present disclosure.

The invention claimed is:

1. A method for inspecting a vehicle brake pad, without removal of a wheel of the vehicle, comprising:

capturing a digital image, via an image capture device, of a side view of the brake pad installed on a vehicle, without removing the wheel that is braked by the brake pad, the side view showing a respective thickness of each of a brake lining and a backing plate of the brake pad;

loading the digital image from the image capture device onto a display screen of a computerized image analysis system;

displaying, in the display screen of the image analysis system, a plurality of movable digital markers as an overlay to be shown on top of the digital image;

adjusting a position of each of the digital markers displayed onscreen to place a first digital marker in alignment with a trailing edge of the backing plate, a second digital marker in alignment with a leading edge of the backing plate, and a third digital marker in alignment with a leading edge of the brake lining;

measuring, on screen in the digital image by the image analysis system, each of a pixel-count thickness of the backing plate as a pixel count distance between the first and second digital markers, and a pixel-count thickness of the brake lining as a pixel count distance between the second and third digital markers;

generating, by the image analysis system, a ratio between the measured pixel-count thickness of the brake lining and the measured pixel-count thickness of the backing plate;

deriving, in the image analysis system, a remaining brake lining thickness based on the generated ratio and one of an average backing plate thickness or an actual backing plate thickness;

comparing, in the image analysis system, the derived remaining brake lining thickness to a threshold value to determine whether the derived remaining brake lining thickness falls within a first range of ratio values indicative that the brake lining has failed inspection and is beyond its useful life requiring the brake pad to be replaced;

generating, by the image analysis system, a service message displayed on the display screen of the image analysis system indicative of one or more results of the comparison and determination, the associated condition of the brake pad, and/or any service recommendations related thereto; and replacing the brake pad of the vehicle in response to a displayed service message generated on the display screen indicative that the brake pad has failed inspection and/or should be replaced.

2. The method of claim 1, wherein the digital image of the side view is taken in a direction substantially perpendicular to a rotational axis of a brake rotor on which the brake pad acts, to show the respective thickness of each of the brake lining and backing plate in the digital image.

3. The method of claim 2, further comprising:

prior to capturing the digital image, placing an imaging sensor of the image capture device within the barrel of the vehicle wheel that is still mounted to the vehicle, at a location adjacent the brake pad such that the thickness of the brake lining and the backing plate of the brake pad is visible within a field of view of the imaging sensor.

4. The method of claim 3, wherein the imaging sensor is disposed at a distal end of a probe of the image capture device.

5. The method of claim 4, wherein the imaging sensor captures the digital image of the side view of the brake pad through an inspection hole defined in a brake caliper to which the brake pad is affixed, and through which the thickness of each of the brake lining and backing plate are visible.

6. The method of claim 3, further comprising:

displaying on the display screen of the image analysis system a live view of that which is visible in the field of view of the imaging sensor; and adjusting a position of the imaging sensor with respect to the brake pad to align predetermined features of one or more of the brake lining or backing plate with one or more onscreen alignment guides displayed in a fixed orientation in the display screen.

7. The method of claim 1, further comprising:

sending the digital image from the image capture device to the digital analysis system via one of a communications network or hardwired link.

8. The method of claim 1, further comprising:

after loading the digital image onto the display screen of the image analysis system, orienting the digital image in the display screen of the display device by one or more of panning, rotating, or zooming the digital image on the display screen, such that the leading and trailing edges of the backing plate and brake lining are arranged vertically on the display screen.

9. The method of claim 8, wherein the orienting is performed automatically by the image analysis system utilizing automatic edge detection to identify each of the leading and trailing edges of each of the backing plate and brake lining, and automatically align such edges in a vertical orientation on the display screen.

10. The method of claim 8, further comprising:

applying, by the image analysis system, an alignment grid overlay of vertical and horizontal lines on top of the digital image of the side view of the brake pad on the display screen, to assist in vertically orienting the leading and trailing edges of the backing plate and brake lining on the display screen.

11. The method of claim 1, wherein the measuring of the on-screen thickness of each of the backing plate and brake lining shown in the digital image is performed by determining, by the image analysis system, the straight line pixel count distances in the horizontal direction between the respective markers located at each of the leading and trailing edges of each of the backing plate and brake lining.

12. The method of claim 11, wherein the plurality of digital markers each comprise a vertical line shown on the display screen.

13. The method of claim 12, wherein the adjusting of the position of the digital markers comprises:

manually moving the plurality of digital markers in a horizontal direction on the display screen, such that the vertical line of the first digital marker is aligned with the trailing edge of the backing plate shown in the digital image, the vertical line of the second digital marker is aligned with the leading edge of the backing plate shown in the digital image, and the vertical line of the third digital marker is aligned with the leading edge of the brake lining shown in the digital image.

14. The method of claim 13, wherein the display screen is a touch screen, and manually moving the digital markers comprises, for each such marker:

touching the display screen at the location of each respective digital marker; and dragging each digital marker on the display screen until its respective vertical line is aligned with its respective leading or trailing edge of the backing plate or brake lining on the display screen.

15. The method of claim 14, wherein the measuring of the on-screen thickness of the backing plate is performed by measuring the number of adjacent pixels in a straight horizontal line between the first digital marker and the second digital marker, and wherein the measuring of the on-screen thickness of the brake lining is performed by measuring the number of adjacent pixels in a straight horizontal line between second digital marker and the third digital marker.

16. The method of claim 13, further comprising:

displaying a live changing generated ratio on the display screen in real time as each marker is moved onscreen.

17. The method of claim 12, further comprising:

automatically detecting in the digital image on the display screen, by automatic edge detection in the image analysis system, each of the leading and trailing edges of each of the backing plate and brake lining, wherein the adjusting of the position of the digital markers comprises:

automatically placing on the digital image in the display screen, by the image analysis system, the vertical line of the first digital marker in alignment with the trailing edge of the backing plate, the vertical line of the second digital marker in alignment with the leading edge of the backing plate, and the vertical line of the third digital marker in alignment with the leading edge of the brake lining.

18. The method of claim 1, wherein the available options for the generated service message include at least one of a message indicative that the inspected brake pad has passed inspection and there is a sufficient thickness of brake lining left to continue safely operate the vehicle, or the inspected brake pad has failed inspection and there is not a sufficient thickness of brake lining left, relative to the backing plate thickness, to continue safely operate the vehicle and the brake pads should be replaced.

19. The method of claim 1, further comprising:
 repeating each of the steps for each brake pad installed on the vehicle.

20. The method of claim 1, further comprising:
 storing the results of the inspection for each inspected brake pad in a customer database in communication with the image analysis system.

\* \* \* \* \*